United States Patent
Mojtahedzadeh et al.

(10) Patent No.: US 11,783,301 B2
(45) Date of Patent: Oct. 10, 2023

(54) SYSTEMS AND METHODS FOR OPTIMIZING MAINTENANCE PLANS IN THE PRESENCE OF SENSOR DATA

(71) Applicant: The Boeing Company, Chicago, IL (US)

(72) Inventors: Mohammad Mojtahedzadeh, Renton, WA (US); Robert A. Bernicchi, Yarrow Point, WA (US); Shervin Beygi, Seattle, WA (US); Karin E. Bauer, Seattle, WA (US); Michael John Avendt, Tukwila, WA (US)

(73) Assignee: THE BOEING COMPANY, Chicago, IL (US)

( * ) Notice: Subject to any disclaimer, the term of this patent is extended or adjusted under 35 U.S.C. 154(b) by 989 days.

(21) Appl. No.: 16/238,424

(22) Filed: Jan. 2, 2019

(65) Prior Publication Data

US 2020/0210968 A1  Jul. 2, 2020

(51) Int. Cl.
*G06Q 10/20* (2023.01)
*G06Q 10/0631* (2023.01)
*G07C 5/08* (2006.01)

(52) U.S. Cl.
CPC ..... *G06Q 10/20* (2013.01); *G06Q 10/063116* (2013.01); *G07C 5/0816* (2013.01)

(58) Field of Classification Search
None
See application file for complete search history.

(56) References Cited

U.S. PATENT DOCUMENTS 5,917,433 A * 6/1999 Keillor ............... G08G 1/20
340/989
8,117,007 B2 * 2/2012 Yitbarek ............ G06Q 10/06
701/29.4

(Continued)

FOREIGN PATENT DOCUMENTS

WO  WO2005038613 A2 *  4/2005
WO  WO2005069246 A2 *  7/2005  ............ G08C 17/02

(Continued)

OTHER PUBLICATIONS

Daily, Jim, and Jeff Peterson. "Predictive maintenance: How big data analysis can improve maintenance." Supply chain integration challenges in commercial aerospace. Springer, Cham, 2017. 267-278. (Year: 2017).*

Yiwei Wang, Christian Gogu, Nicolas Binaud, Christian Bes, Raphael T. Haftka, Nam H. Kim, "A cost driven predictive maintenance policy for structural airframe maintenance", Chinese Journal of Aeronautics, vol. 30, Issue 3, 2017, pp. 1242-1257. (Year: 2017).*

(Continued)

*Primary Examiner* — Paul R Fisher
(74) *Attorney, Agent, or Firm* — Jordan IP Law, LLC

(57) ABSTRACT

Systems and methods for generating a sensor driven optimized maintenance program are provided. A first maintenance plan for an apparatus type is received; the first maintenance plan defining maintenance tasks for the apparatus type and defining intervals at which the maintenance tasks are to be performed. Historical sensor data, historical scheduled maintenance data, and historical unscheduled maintenance data are received and correlated to determine a predictive value of the sensor data. One or more maintenance optimization objectives of an operator of an apparatus of the apparatus type are received, and the sensor driven optimized maintenance program is generated, based at least on the predictive value of the sensor data and the maintenance optimization objectives. The sensor driven optimized maintenance program includes an adjusted one of the defined intervals.

20 Claims, 14 Drawing Sheets

(56) References Cited

U.S. PATENT DOCUMENTS

| | | | | |
|---|---|---|---|---|
| 2004/0182574 | A1* | 9/2004 | Adnan | E21B 44/00 |
| | | | | 166/250.01 |
| 2004/0188513 | A1* | 9/2004 | Rabenold | G06Q 30/06 |
| | | | | 235/375 |
| 2008/0133178 | A1* | 6/2008 | Byrne | G05B 23/0283 |
| | | | | 702/184 |
| 2008/0201054 | A1* | 8/2008 | Grichnik | F02D 41/1401 |
| | | | | 703/2 |
| 2009/0037122 | A1* | 2/2009 | Engel | G06F 17/18 |
| | | | | 702/35 |
| 2009/0158756 | A1* | 6/2009 | Brown | B60H 1/00585 |
| | | | | 62/77 |
| 2014/0121885 | A1 | 5/2014 | Schoonveld | |
| 2014/0365178 | A1* | 12/2014 | Schramm | G05B 23/0208 |
| | | | | 702/184 |
| 2016/0125672 | A1* | 5/2016 | Pekar | G05B 23/0221 |
| | | | | 702/32 |
| 2016/0133066 | A1 | 5/2016 | Lavie | |
| 2016/0343093 | A1* | 11/2016 | Riland | G06Q 50/06 |
| 2018/0155060 | A1 | 6/2018 | Dauenhauer et al. | |

FOREIGN PATENT DOCUMENTS

| | | | | |
|---|---|---|---|---|
| WO | WO2005086760 | A2 * | 9/2005 | |
| WO | WO2008139493 | A1 * | 11/2008 | G05B 23/02 |

OTHER PUBLICATIONS

Schmidt, B., Wang, L. "Cloud-enhanced predictive maintenance." Int J Adv Manuf Technol 99, 5-13 (2018). https://doi.org/10.1007/s00170-016-8983-8 (Year: 2018).*

K. A. Kaiser and N. Z. Gebraeel, "Predictive Maintenance Management Using Sensor-Based Degradation Models," in IEEE Transactions on Systems, Man, and Cybernetics—Part A: Systems and Humans, vol. 39, No. 4, pp. 840-849, Jul. 2009, doi: 10.1109/TSMCA.2009.2016429. (Year: 2009).*

D. B. Durocher and G. R. Feldmeier, "Predictive versus preventive maintenance," in IEEE Industry Applications Magazine, vol. 10, No. 5, pp. 12-21, Sep.-Oct. 2004, doi: 10.1109/MIA.2004.1330766. (Year: 2004).*

Wim J.C. Verhagen, Lennaert W.M. De Boer, Predictive maintenance for aircraft components using proportional hazard models, Journal of Industrial Information Integration, vol. 12, 2018, pp. 23-30, ISSN 2452-414X, https://doi.org/10.1016/jjii.2018.04.004. (Year: 2018).*

Hang, Lei, et al. "Design and Implementation of a Sensor-Cloud Platform for Physical Sensor Management on CoT Environments." Electronics 7.8 (2018) (Year: 2018).*

"Extended European Search Report Received for Application No. 19217345.8-1222", dated Feb. 25, 2020, 8 Pages.

Singapore Search Report Received for Application No. 10201914004P dated Jan. 13, 2021, 7 Pages.

* cited by examiner

SYSTEMS AND METHODS FOR
OPTIMIZING MAINTENANCE PLANS IN
THE PRESENCE OF SENSOR DATA

BACKGROUND

Vehicle fleet operators follow maintenance plans, in order to provide for efficient operations and fleet utilization. Examples of such vehicles include but are not limited to aircraft, air-cargo vehicles, automotive, unmanned aerial vehicles (UAV), maritime vehicles (ships, submarines, etc.), etc. In the case of an aircraft, maintenance planning data (MPD) is often provided to the operator of an aircraft by the manufacturer, and typically includes information related to recommended scheduled maintenance tasks, their intervals, required access, and other relevant information. Maintenance tasks often are grouped and performed in packages identified as "check packages".

In some operational scenarios, operator uses the MPD as a starting point and adjusts its maintenance plan schedule based on financial considerations, for example the cost of removing a vehicle from service and performing a particular check package. However, maintenance plan schedule adjustments that are blind to actual operational conditions and available historical data, introduces the likelihood of performing maintenance more often than is necessary (thereby increasing cost), or less often than is optimal to maintain operational risks below a target acceptable maintenance plan that leverage historical maintenance data and sensor data.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects and implementations disclosed herein are directed to methods for generating a sensor driven optimized maintenance program (SDOMP). An example method comprises: receiving a first maintenance plan for an apparatus type, the first maintenance plan defining maintenance tasks for the apparatus type and defining intervals at which the maintenance tasks are to be performed; receiving historical sensor data (including sensor alert data), historical scheduled maintenance data, historical unscheduled maintenance data, and documentation linking sensor alerts with maintenance tasks; correlating the historical sensor data with the historical scheduled maintenance data and the historical unscheduled maintenance data to determine a predictive value of the sensor data; receiving one or more maintenance optimization objectives of an operator of an apparatus of the apparatus type; and based at least on the predictive value of the sensor data and the maintenance optimization objectives, generating the SDOMP, the generated SDOMP comprising an adjusted one of the defined intervals.

Systems and methods for generating an SDOMP are also provided. A first maintenance plan for an apparatus type is received; the first maintenance plan defining maintenance tasks for the apparatus type and defining intervals at which the maintenance tasks are to be performed. Historical sensor data, historical scheduled maintenance data, and historical unscheduled maintenance data are received and correlated to determine a predictive value of the sensor data. One or more maintenance optimization objectives of an operator of an apparatus of the apparatus type are received, and the SDOMP is generated, based at least on the predictive value of the sensor data and the maintenance optimization objectives. The SDOMP includes an adjusted one of the defined intervals.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

Figure 1:
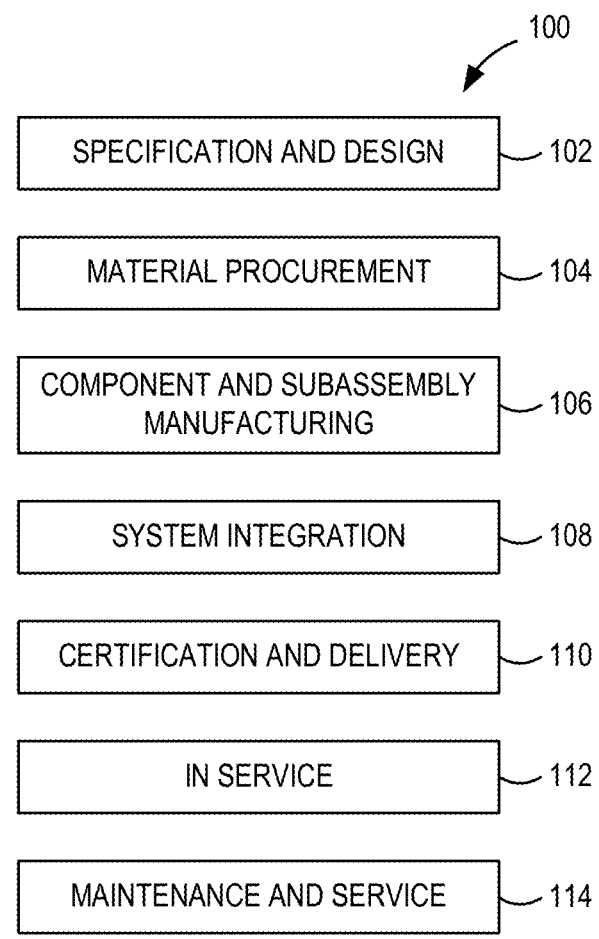
FIG. 1 is a block diagram of apparatus production and service methodology.

The various embodiments will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps.

Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property could include additional elements not having that property.

Sensors onboard an apparatus are used with the goal of developing sensor-based prognostic tools to predict failures. This has the potential to replace preventive maintenance with predictive maintenance. The sensors however, are typically deployed by component vendors or design engineers who often do not possess a complete knowledge of inspection programs. Therefore, a functional mapping between sensors and maintenance tasks enable improved inspection intervals through virtual (sensor-enabled) inspections. Unfortunately, due to the probabilistic nature of some sensor data, some operators could ignore alerts assuming them to be false alarms. This hinders realization of the full potential benefits of the sensors. In general, a sensor alert is a subset of sensor data, because some alerts are a binary condition of a sensor measurement exceeding a threshold.

Probabilistic sensor data is convertible into objective, rigorous and actionable information in the form of revised inspection intervals, without the reliance on only operator interpretation of alerts. Thus, the benefits of the sensors are realized through reduced maintenance cost, improved efficiency and increased apparatus utilization, when sensors are at least partial predictors of failure or degradation.

Aspects of the present disclosure provide a computer implemented method, apparatus, and computer program product for generating a sensor driven optimized maintenance program (SDOMP). A first maintenance plan for an apparatus type is received; the first maintenance plan defining maintenance tasks for the apparatus type and defining intervals at which the maintenance tasks are to be performed. Historical sensor data, historical scheduled maintenance data, and historical unscheduled maintenance data are received and correlated to determine a predictive value of the sensor data. One or more maintenance optimization objectives of an operator of an apparatus (e.g., owner of the apparatus or fleet of the apparatus, administrator responsible for the apparatus or fleet of the apparatus, or a user operating the apparatus) of the apparatus type are received, and the SDOMP is generated, based at least on the predictive value of the sensor data and the maintenance optimization objectives. The SDOMP includes an adjusted one of the defined intervals.

For a particular apparatus (e.g., a type or model of a particular apparatus or fleet of apparatus), historic maintenance data includes costs that have been incurred for each maintenance event under an approved maintenance plan (AMP). Historical maintenance data includes historical scheduled maintenance data and historical unscheduled maintenance data. A maintenance event is any event that is associated with maintenance, repair, or replacement of a component of an apparatus. In one embodiment, a maintenance event includes, for example, a functional part failure, a system failure, loss of function, decreased function, service interrupt, corrosion, wear, slow response time, decreased efficiency, decreased fuel efficiency, loss of tire pressure, or any other event that necessitates maintenance, repair, or replacement of a component or subpart of a component. Further, each maintenance event includes one or more maintenance packages, and each maintenance package includes one more maintenance tasks. As used herein, a maintenance task is a task associated with inspecting, maintaining, repairing, and/or replacing a component or subcomponent. Using the historic maintenance data, the maintenance events, which include one or more maintenance packages, are analyzed to determine a cost associated with each maintenance task.

Using sensor data along with historical maintenance data, costs, and one or more maintenance optimization objectives (e.g., provided by an operator of the apparatus or fleet of the apparatus), available resources (e.g., workers and facility availability at any given time), and a defined length of time for a total operational life cycle of an apparatus (e.g., a defined length of time an operator owns the apparatus or fleet of the apparatus), each of the plurality of maintenance tasks, aspects of the present disclosure minimize the frequency of planned maintenance events and improves apparatus dispatch with optimized scheduling of preventative planned maintenance tasks while minimizing an occurrence of un-planned in-service maintenance tasks. For example, by increasing an interval for a maintenance task (e.g., the number of days between performing the maintenance task), that particular maintenance task is performed on the apparatus or fleet of the apparatus a decreased number of times for the total operational life cycle the operator owns the apparatus or fleet of the apparatus (e.g., based on a lease agreement). By postponing maintenance for the particular maintenance task, the costs associated with performing the particular maintenance is also postponed. For a leased apparatus or fleet of the apparatus, the increased interval could result in the particular maintenance being postponed beyond the apparatus's lease return date. As such, the apparatus company would not incur the cost of the particular maintenance given the apparatus would be returned prior to the particular maintenance being performed.

Scheduled maintenance activities are those maintenance activities that are planned in advance, whereas unscheduled maintenance activities are those activities that occur as a result of a failure or non-routine finding. A routine finding is a condition that is detected or determined to be as expected during an inspection (whether scheduled or unscheduled), for example a tread depth on a tire after a certain amount of usage. A non-routine finding is an unexpected condition that is detected or determined during an inspection (whether scheduled or unscheduled), for example corrosion or deterioration of some component in a state beyond what is expected and/or loss of functionality.

Figure 2:
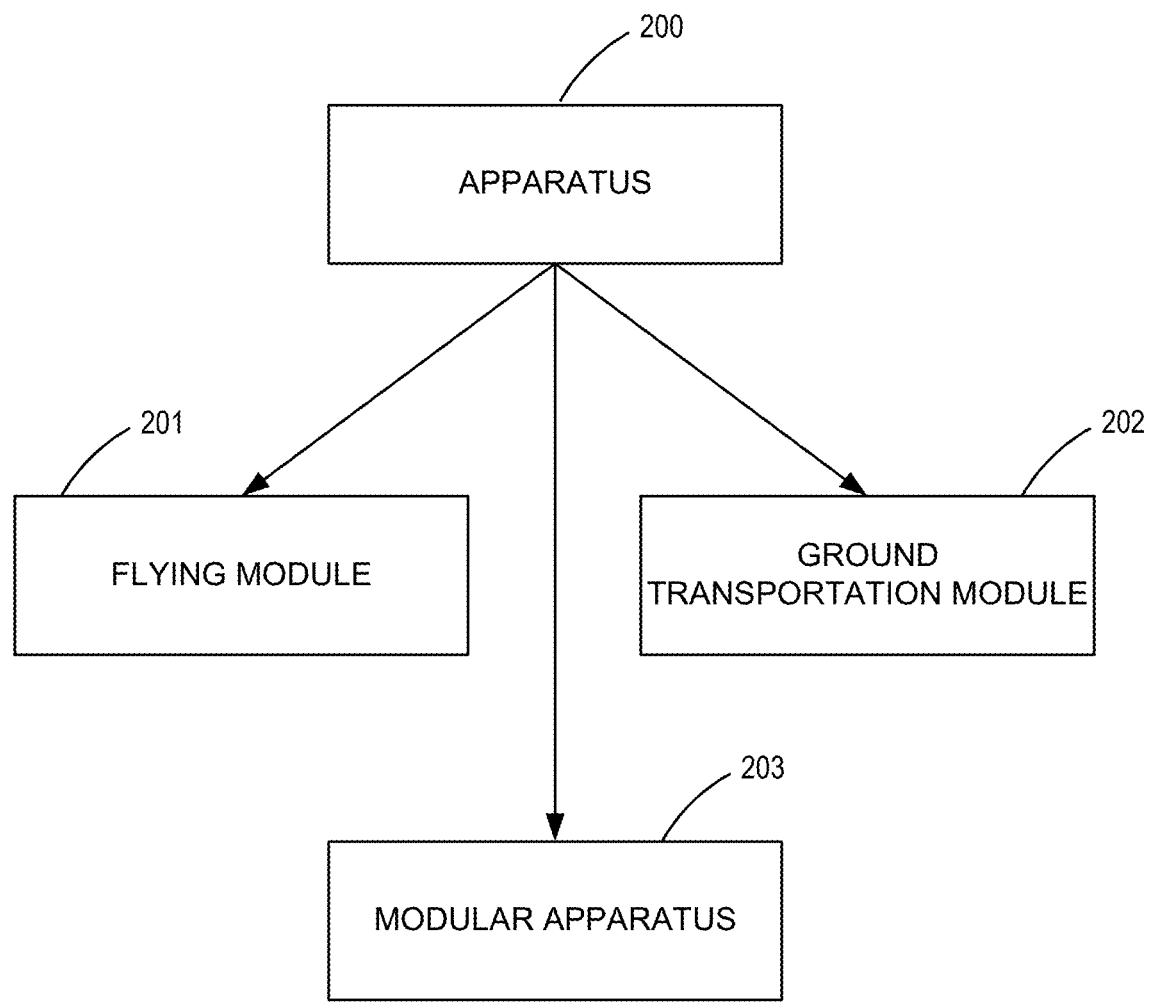
FIG. 2 is a block diagram of an apparatus 200 for various aspects of the disclosure.

Referring more particularly to the drawings, embodiments of the disclosure are described in the context of an apparatus of manufacturing and service method 100 as shown in FIG. 1 and apparatus 200 provided in FIG. 2. Turning first to FIG. 1, a diagram illustrating an apparatus (e.g., the carrying module 200) manufacturing and service method is depicted in accordance with an embodiment. In one embodiment, during pre-production, the apparatus manufacturing and service method 100 includes specification and design 102 of the apparatus 200 in FIG. 2 and material procurement 104. During production, component and subassembly manufacturing 106 and system integration 108 of the apparatus 200 in FIG. 2 takes place. Thereafter, the apparatus 200 in FIG. 2 goes through certification and delivery 110 in order to be placed in service 112. While in service by a customer, the apparatus 200 in FIG. 2 is scheduled for routine maintenance and service 114, which, in one embodiment, includes modification, reconfiguration, refurbishment, and other maintenance or service described herein.

In one embodiment, each of the processes of the apparatus manufacturing and service method 100 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one embodiment, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 2, the apparatus 200 is provided. As shown in FIG. 2, an example of the apparatus 200 is a flying apparatus 201, such as an aerospace vehicle, aircraft, air cargo, flying car, and the like. As also shown in FIG. 2, a further example of the apparatus 200 is a ground transportation apparatus 202, such as an automobile, a truck, heavy equipment, construction equipment, a boat, a ship, a submarine and the like. A further example of the apparatus 200 shown in FIG. 2 is a modular apparatus 203 that comprises at least one or more of the following modules: an Air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 3:
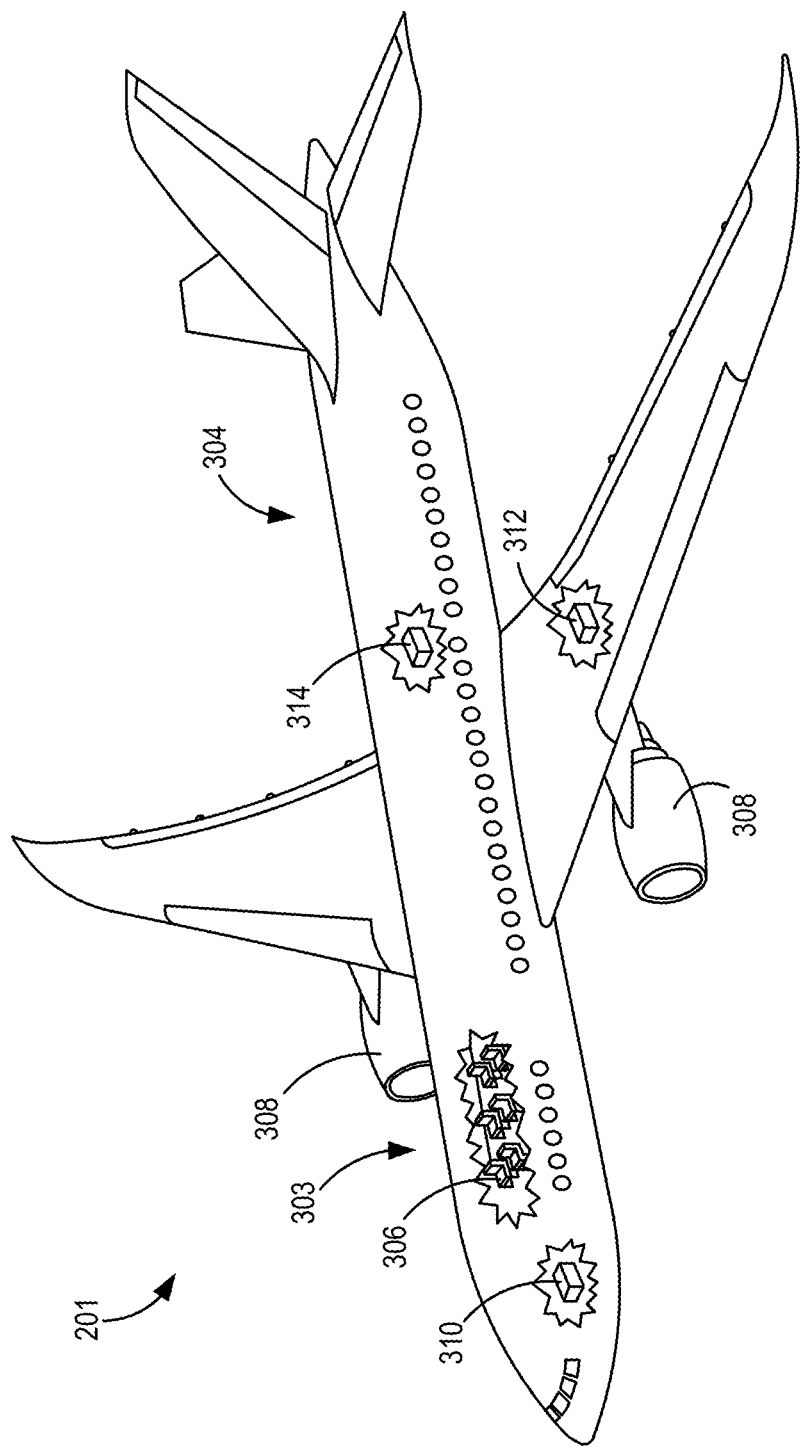
FIG. 3 is a schematic perspective view of a particular flying module 201.

With reference now to FIG. 3, a more specific diagram of the flying module 201 is depicted in which an embodiment is implemented. In this example, the flying module 201 is an aircraft produced by the apparatus manufacturing and service method 100 in FIG. 1 and includes an airframe 303 with a plurality of systems 304 and an interior 306. Implementations of the plurality of systems 304 include one or more of a propulsion system 308, an electrical system 310, a hydraulic system 312, and an environmental system 314. However, other systems are also candidates for inclusion. Although an aerospace example is shown, different advantageous embodiments are applied to other industries, such as the automotive industry, etc.

Figure 4:
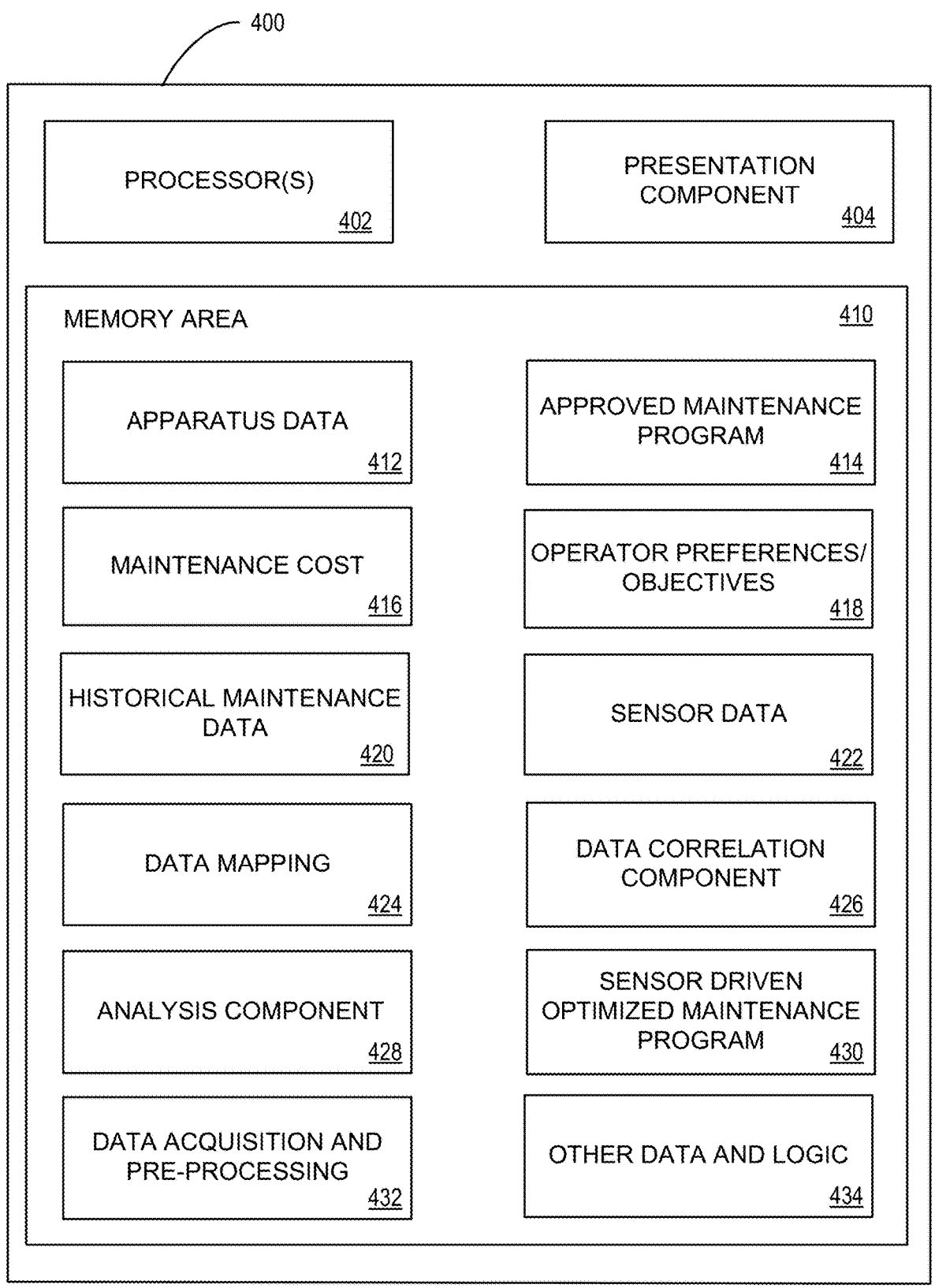
FIG. 4 is a block diagram of an implementation of a memory area 410 for a computing device 400.

With reference now to FIG. 4, a block diagram of a computing device 400 for generating an SDOMP is provided. In some implementations, the computing device 400 includes one or more processors 402, one or more presentation components 404 and a memory area 410. The disclosed implementations associated with the computing device 400 are practiced by a variety of computing devices, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network. Further, while the computing device 400 is depicted as a seemingly single device, in one embodiment, multiple computing devices work together and share the depicted device resources. For instance, in one embodiment, the memory area 410 is distributed across multiple devices, the processor(s) 402 provided are housed on different devices, and so on.

In one embodiment, the processor(s) 402 includes any quantity of processing units that read data from various entities, such as the memory area 410. Specifically, the processor(s) 402 are programmed to execute computer-executable instructions for implementing aspects of the disclosure. In one embodiment, the instructions are performed by the processor, by multiple processors within the computing device 400, or by a processor external to the computing device 400. In some implementations, the processor(s) 402 are programmed to execute instructions such as those illustrated in the flowcharts discussed below and depicted in the accompanying drawings. Moreover, in some implementations, the processor(s) 402 represent an implementation of analog techniques to perform the operations described herein. For example, the operations are performed by an analog client computing device 400 and/or a digital client computing device 400.

The presentation component(s) 404 present data indications to an operator (e.g., owner of the apparatus or fleet of the apparatus, administrator responsible for the apparatus or fleet of the apparatus, or a user operating the apparatus) or to another device. In one implementation, presentation components include a display device, speaker, printing component, vibrating component, etc. One skilled in the art will understand and appreciate that computer data is presented in a number of ways, such as visually in a graphical user interface (GUI), audibly through speakers, wirelessly between the computing device 400, across a wired connection, or in other ways. In one embodiment, presentation component(s) 404 are not used when processes and operations are sufficiently automated that a need for human interaction is lessened or not needed. For example, in some embodiments, the process of generating and implementing the SDOMP and changing unscheduled tasks to scheduled tasks and implementing the scheduled tasks is fully automated without user intervention.

The memory area 410 stores apparatus data 412, an approved maintenance program (AMP) 414, maintenance costs 416, maintenance optimization objectives 418 (provided by an operator), historical maintenance data 420, sensor data 422, data mapping component 424, a data correlation component 426, an analysis component 428, a SDOMP 430, a data acquisition and pre-processing component 432, and other data and logic 434. The apparatus data 412 includes an apparatus delivery date, an apparatus retirement date, and operating hours for a particular type of apparatus or fleet of apparatus, and if leased, an apparatus's lease return date, clearance period, and lease terms (e.g., what maintenance event must be performed before returning the apparatus to the lessor). In one embodiment, the AMP 414 includes one or more of the following: maintenance planning data (MPD), apparatus specific maintenance tasks, an inspection event for the apparatus, labor hours spent, and access requirements during maintenance. In some implementations, the memory area 410 additionally stores a first improved maintenance program that is a more optimized version of the AMP 414, although is subject to improvement using the sensor data 422. The maintenance costs 416 includes data relating to historic costs incurred by an operator for a plurality of maintenance tasks for an apparatus or fleet of the apparatus. And more specifically, the historic cost of each event stored in the maintenance costs 416 are based on known costs incurred from one or more maintenance providers (e.g., a company that performed the task associated with the maintenance tasks that is provided in the maintenance costs 416), based on apparatus labor, materials, and the like. The historical maintenance data 420 includes information describing historic maintenance events that have been performed from the AMP 414, including historical scheduled maintenance data, and historical unscheduled maintenance data.

The sensor data 422 includes sensor-based alerting system (SBAS) apparatus health management (AHM) alert data, which, in some implementations includes data on measurable components, such as any or all of tire pressure, oxygen pressure, hydraulic fluid, auxiliary power unit (APU) oil level, engine oil level, and the like. In some implementations, SBAS alert data includes apparatus health management (AHM) alert data. The sensor data 422 also includes data from other sensors aboard or in communication with the apparatus. In embodiments, the sensor data 422 includes both historical sensor data and current (e.g., real time) sensor data. The data mapping component 424 includes a map of SBAS alert data to scheduled maintenance task findings and the logic to create the map. The data correlation component 426 establishes a correlation between non-routine findings and preceding relevant maintenance messages. The analysis component 428 is a software statistical analysis tool that identifies an optimal event requirement for planning maintenance on an apparatus or fleet of apparatus. In one embodiment, the statistical analysis is implemented using known or available statistical application program, such as, but without limitation, statistical analysis software (SAS). The SDOMP 430 is the resulting generated product. The data acquisition and the pre-processing component 432, and the other data and logic 434 are used for processing and storing data in support of the data mapping component 424 and the analysis component 428. For example, the other data and logic 434 comprises the operation history for the apparatus, the end date to the SDOMP 430 (e.g., the lease end date), and data for determining a net benefit of adjusting an interval (e.g., using maintenance costs 416).

Figure 5:
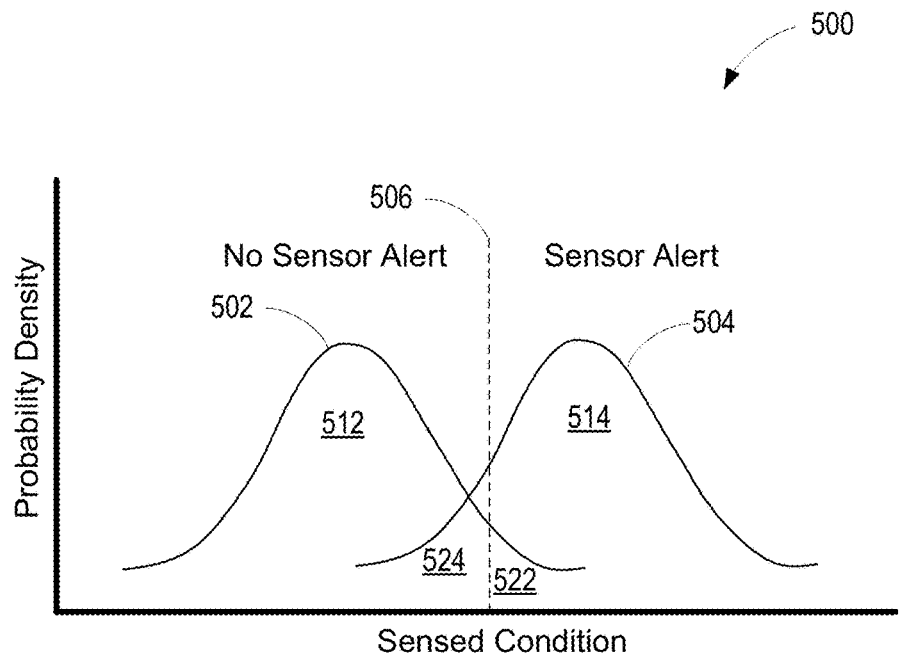
FIG. 5 illustrates overlapping probability density curves and a threshold that drives probability of detection and probability of false alarm values.

FIG. 5 illustrates a plot 500 that provides overlapping probability density curves 502 and 504 and a threshold 506 that drives probability of detection and probability of false alarm values. The curve 502 shows the sensor measurement output for a condition that should not result in an alert. The curve 504 shows the sensor measurement output for a condition that should result in an alert. Unfortunately, neither sensors nor interpretation of measured sensor output is perfectly correct. As a result, some situations that should not result in an alert produce a sensor measurement output that is indistinguishable from the sensor measurement output that should exist in other situations that so merit an alert, and thus, the curves 502 and 504 overlap. The threshold 506 is set such that it determines whether an alert is generated. If a sensed condition exceeds the threshold 506, a sensor alert is issued; conversely, if a sensed condition falls below the threshold 506, no sensor alert is issued. This creates four possibilities: Region 512 falls under the curve 502 and is below the threshold 506. Therefore, the region 512 represents the situation that the condition should not result in an alert and no alert is issued. This is a true negative, which correctly has no alerts. Region 522 falls under the curve 502 and is above the threshold 506. Therefore, the region 522 represents a false positive (e.g., a false alarm), which is a situation in which the condition should not result in an alert, but an alert is issued. This is a false alarm situation. Region 514 falls under the curve 504 and is above the threshold 506. Therefore, the region 514 represents a true positive, which is a situation in which the condition should result in an alert and alert is issued. This is a correct detection situation. Region 524 falls under the curve 504 and is below the threshold 506. Therefore, the region 524 represents a false negative, which is a situation in which the condition should result in an alert, but an alert is not issued. This is also commonly identified as a missed detection situation. In one embodiment, the threshold 506 is adjusted upward or downward to find a desired balance (e.g., an optimal threshold) between a probability of detection ($P_D$) and a probability of false alarm ($P_{FA}$). $P_D$ is represented by the region 514 and $P_{FA}$ is represented by the region 522. In general, increasing the threshold 506 reduces $P_{FA}$, but at a cost of reducing PD.

Figure 6:
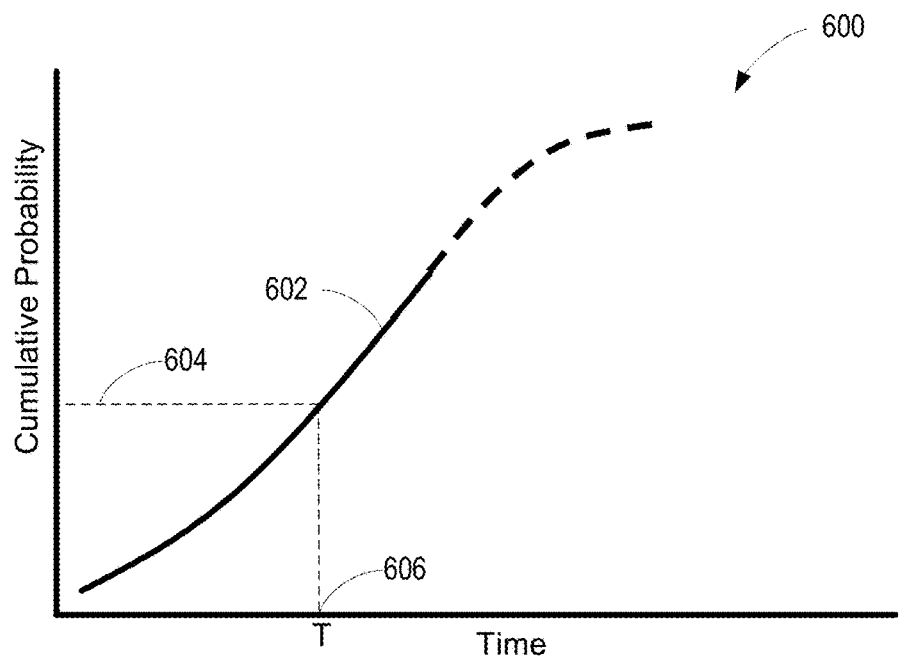
FIG. 6 illustrates a cumulative distribution function (CDF) for a probability of detecting a condition requiring a repair or other maintenance action.

FIG. 6 illustrates a cumulative distribution function (CDF) curve 602 for a cumulative probability of detecting a condition requiring a repair or other maintenance action. In one implementation, the CDF curve 602 is obtained by applying statistical analysis methods to historical inspection data, such as a maintenance record dataset for scheduled maintenance findings, and logbook dataset for unscheduled maintenance. In another implementation, the CDF curve 602 is generated using statistical analysis scheduled maintenance optimization engine (SASMO), which is described in U.S. Pat. No. 8,117,007. The CFD curve 602 shows the probability of a non-routine finding, and some implementations of the CDF curve 602 are obtained by analyzing the historical maintenance data of an apparatus and its components. A maintenance action is, for example, an unscheduled repair, whereas a maintenance task is, for example, an inspection or preventive maintenance. If a non-routine finding condition is not remedied in a timely manner, the result is potentially an impending unscheduled maintenance action. The CDF curve 602 is an estimate using the historical maintenance data 420 from one or more operators, and represents the likelihood (probability) of detecting a condition requiring a repair or other maintenance action at some inspection time after a prior inspection had not identified such a condition. A given target acceptable risk level is indicated by line 604. Where the line 604 intersects the CDF curve 602, this indicates an inspection interval T 606 in units of time. An inspection prior to the interval T 606 is an early inspection and is less likely to result in the identification of a condition requiring a repair or other maintenance action. An inspection after the interval T 606 is a late (escalated) inspection and, under some situations, is more likely to result in the identification of a condition requiring a repair or other maintenance action. Without using sensor data, inspection intervals are often set according to the interval T 606 determined as described above.

Maintenance optimization services help optimize an operator's maintenance program based on scheduled and unscheduled maintenance data, combined with the sensor data 422. SBAS uses real-time sensor data, for example, tire pressure, oxygen pressure, hydraulic fluid, auxiliary power unit (APU), and engine oil levels, to offer diagnostic and prognostic services. The diagnostic and prognostic capabilities in SBAS are leveraged to convert unscheduled maintenance into scheduled maintenance, while also optimizing certain inspection task intervals. In one embodiment, the inspection tasks whose findings are perfectly predicted by the sensor data 422 are performed virtually, whereas, if the sensor data 422 is only a partial predictor of maintenance task findings, both virtual and locational inspection of tasks are performed. Thus, the actual locational inspection interval is escalated according to the predictive value of the sensor data 422.

Figure 7:
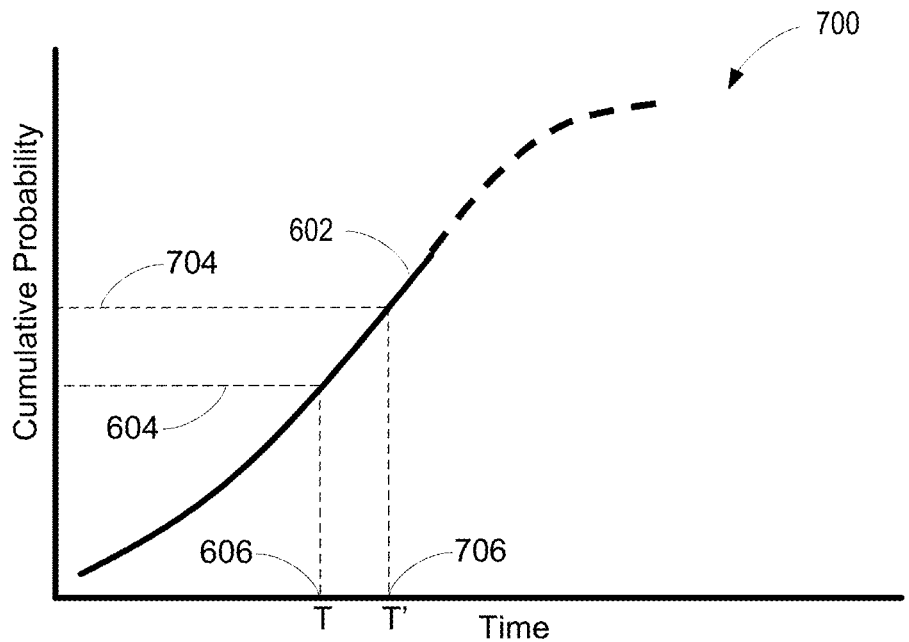
FIG. 7 illustrates a changed threshold for the CDF curve of FIG. 6.

FIG. 7 illustrates a changed inspection interval as related to the CDF curve 602, enabled by the advantageous use of the sensor data 422. When sensors are perfect predictors of failure or degradation, the optimal inspection interval approached infinity because inspections are no longer required. However, physical limitations instead mean that sensors are partial predictors of failure or degradation. This permits taking additional risk, relative to relying only on physical inspections, as shown using a new acceptable risk level indicated by line 704 above the line 604. Where the line 704 intersects the CDF curve 602, indicates a new inspection interval T' (T prime) 706 in units of time, which occurs later (a longer interval) than the interval T 606. Line 604 indicates the cumulative probability of a physical inspection identifying non-routine finding, and it is set at that the acceptable risk level. Line 704 indicates the cumulative probability of a physical inspection, a sensor alert, or both identifying non-routine finding at the prior inspection interval, T. Because, in some implementations, a sensor alert improves the cumulative probability at a given interval, the interval can be escalated (lengthened) to T' while still preserving the same acceptable risk level.

Figure 8:
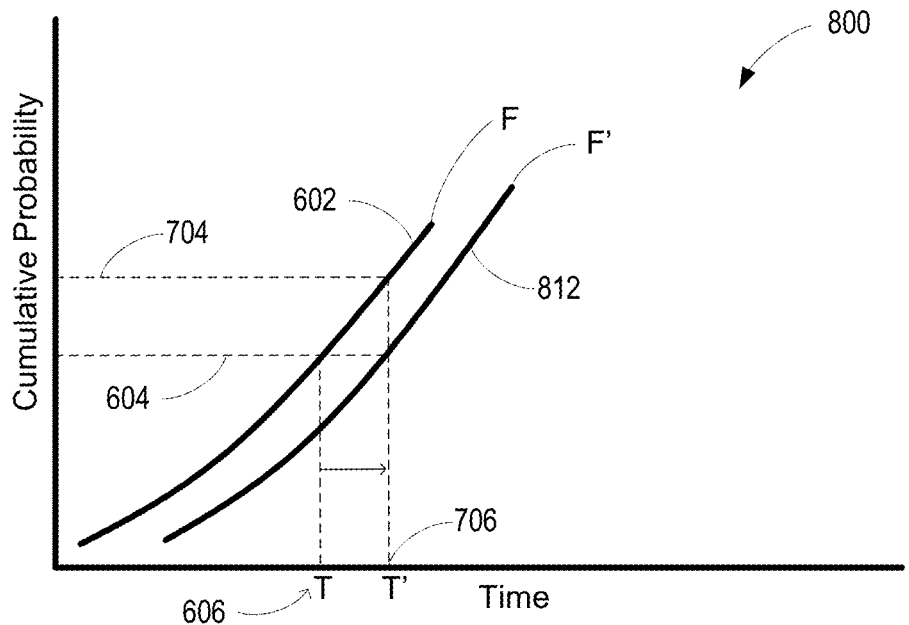
FIG. 8 illustrates graphically how the changed threshold of FIG. 7 is determined.

FIG. 8 illustrates graphically how the changed threshold of FIG. 7 is determined. The CDF curve 602 for the cumulative probability of identifying non-routine findings, which includes degradation and failures, is used along with the interval T 606 to determine the target acceptable risk level indicated by the line 604. The probability, P, that a sensor alert predicts a potential failure is determined, such as by using the historical maintenance data 420. Since there is a probability P that a sensor alert predicts the potential failure, a special construct for an equivalent risk level, R equivalent, enables estimation of the risk that would be incurred, with an extended interval in the absence of sensor data. In actual operation, the resulting risk, with the extended interval and the use of the sensor data, does not change. R_equivalent is related to the original target acceptable risk level R and probability P by:

$$R\_equivalent = R + (1-R) \times P \quad \text{Equation 1:}$$

Essentially, the sensor alert addresses the additional $(1-R) \times P$ risk, retaining the effective risk level, R_equivalent, as the original target acceptable risk level R. The equivalent risk level, (R_equivalent) is indicated by the line 704.

$$P(J \cup S) = P(J) + P(S) - P(J \cap S) \quad \text{Equation 2:}$$

$$P(J \cup S) = P(J) + P(S) - P(J|S) \times P(S); \text{ per Baye's equation} \quad \text{Equation 3:}$$

$$P(J \cup S) = P(J) + P(S) - P(J) \times P(S); \text{ since } J \text{ and } S \text{ operate independently} \quad \text{Equation 4:}$$

$$P(J \cup S) = P(J) + (1 - P(J)) \times P(S) \quad \text{Equation 5:}$$

Where $P(J \cup S)$ is the probability of a physical inspection, J, or Sensor, S, or both detecting a non-routine finding, P(J) is the probability of a physical inspection, J, alone detecting a non-routine finding, and P(S) is the probability (correct detection) of a sensor, S, alone detecting a non-routine finding. The point where the line 704 intersects the CDF curve 602, this indicates the new inspection interval T' 706 in units of time. An undetected failure probability distribution curve 812 represents the likelihood of a failure occurring that had not been predicted by a sensor alert. The original target acceptable risk level indicated by the line 604 intersects the undetected failure probability distribution curve 812 at the position corresponding to the new inspection interval T' 706, showing how the sensor permits increasing the inspection interval (from the T 606 to the T' 706) while maintaining the original target acceptable risk level. In some implementations, if the probability of detection by a sensor is random, with a known distribution (e.g., a Gaussian distribution), then a convolution method is used to estimate the risk mitigated by use of the sensor data 422.

As an illustrative example, a maintenance task reads: "General visual inspection of the engine oil filter element bypass condition," with the interval, T, of 150 flight hours. The initial interval, T, of 150 hours is derived from the CDF curve 602 with an acceptable risk level, R, of 0.4. A sensor continuously measures the oil filter element bypass condition. If the oil filter element bypass passes a certain threshold, the sensor generates an alert from the sensor. Two cases are presented:

Case 1: perfect sensor with P(S)=1. If there is a fault, the sensor will catch it with 100% certainty. In this case Equation 1 becomes:

$$R\_equivalent = R + (1-R) \times P(S) = 0.4 + 0.6 \times 1 \quad \text{Equation 6:}$$

The new physical inspection interval is pushed out indefinitely. That is, the inspection task is removed from physical inspection, and only virtual inspection is needed.

Case 2: imperfect sensor with P(S)=0.8. If there is a fault, the sensor will catch it with 80% certainty. In this case Equation 1 becomes:

$$R\_equivalent = R + (1-R) \times P(S) = 0.4 + 0.6 \times 0.8 = 0.88 \quad \text{Equation 7:}$$

The new physical inspection interval is escalated, although not indefinitely.

Figure 9:
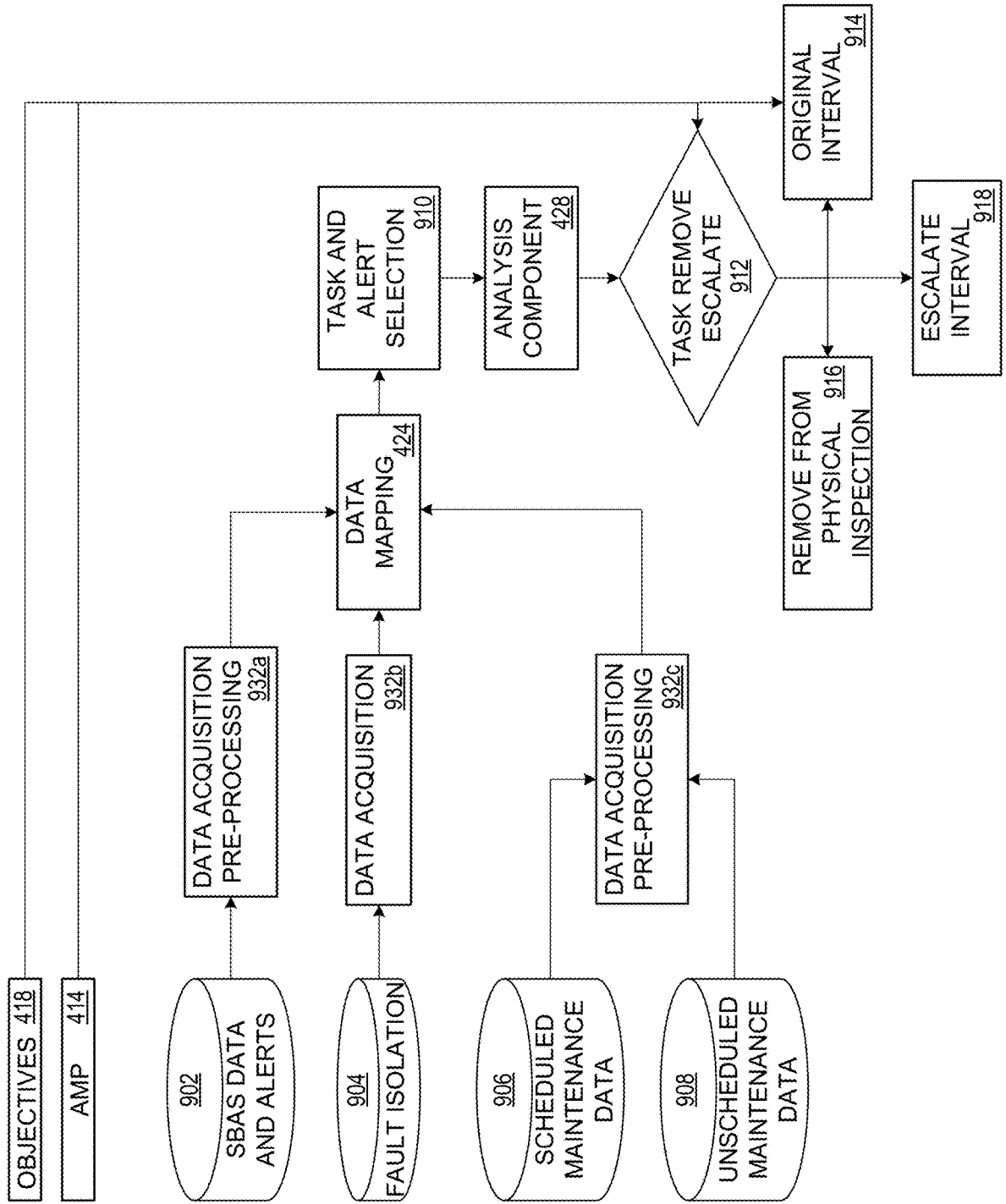
FIG. 9 is a block diagram of an implementation of a process flow for implementing aspects of the disclosure.

FIG. 9 is a block diagram of an implementation of a process flow 900 for implementing aspects of the disclosure. Input data includes the AMP 414 and the maintenance optimization objectives 418, which together specify tasks, intervals, and acceptable risk; SBAS data and alerts 902 which is a portion of the sensor data 422; fault isolation information 904; historical scheduled maintenance data 906; and historical unscheduled maintenance data 908. The historical scheduled maintenance data 906 and the historical unscheduled maintenance data 908 are sourced from the historical maintenance data 420. A data acquisition and preprocessing stage includes using the data acquisition and the pre-processing component 432 to acquire and/or process the SBAS data and alerts 902 with a process 932a, the fault isolation information 904 with a process 932b, and the historical scheduled maintenance data 906 and the historical unscheduled maintenance data 908 with a process 932c. These results are fed into the data mapping component 424. A task and alert selection process 910 selects various maintenance tasks as candidates for removal from physical inspection and/or escalation. Each task is then fed into the analysis component 428. The analysis component 428 then makes a decision in decision operation 912 whether to keep the original interval at 914, remove the task from physical inspection at 916 (thereby making it a virtual inspection), or escalate the interval at 918. In some implementations, the analysis component 428 constructs data to be used for generating the undetected failure probability distribution curve 812.

The decision operation 912 uses the predictive value of the sensor data 422 and the AMP 414 and the maintenance optimization objectives 418. If the sensor data 422 has no predictive value, that is failures and non-routine findings cannot be predicted by any of the sensor data 422 or alert, then the original AMP interval is retained. If the sensor data 422 has complete predictive value, that is failures and non-routine findings are reliably predicted by the sensor data 422 or alerts, then the maintenance task, such as an inspection, is removed from physical inspection. However, if the sensor data 422 has partial predictive value, that is failures and non-routine findings are predictable by the sensor data 422 or alerts with a reasonable probability, then the maintenance task is escalated, according to the reliability of the detection. In this way, the SDOMP 430 is generated based at least on the predictive value of the sensor data 422 and the maintenance optimization objectives 418. In some implementations, the SDOMP 430 includes an adjusted (e.g., escalated or de-escalated) interval, and also reflects removed tasks and some unchanged AMP intervals.

Figure 10:
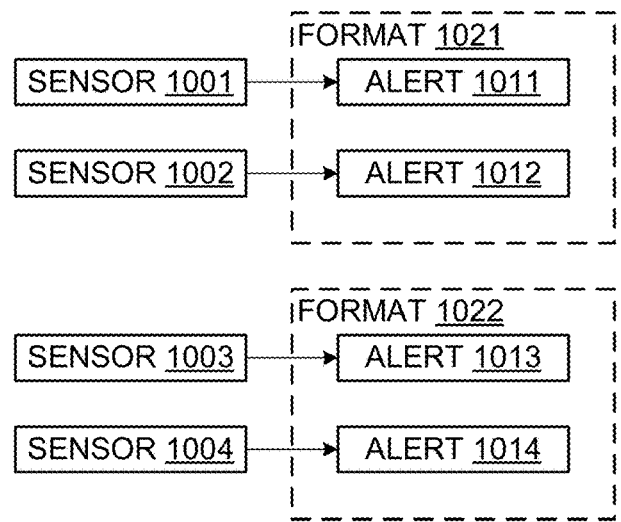
FIG. 10 is an implementation alert display.

FIG. 10 is an implementation of a condition in which SBAS data and alerts from different sensors (e.g., sensors produced by different component suppliers), stored within the SBAS data and alerts 902, are in different formats. For example, alert data 1011 and 1012 from sensors 1001 and 1002, respectively, are in a first format 1021. Alert data 1013 and 1014 from sensors 1003 and 1004, respectively, are in a second, different format 1022. This illustrates the need for the data acquisition and pre-processing component 432 to be able to receive data from different sources, in different formats, and process it as necessary for downstream consumption. The SBAS data and alerts 902 includes data from sensors provided by different component vendors and come from different sources, and thus are not consistently formatted.

Figure 11:
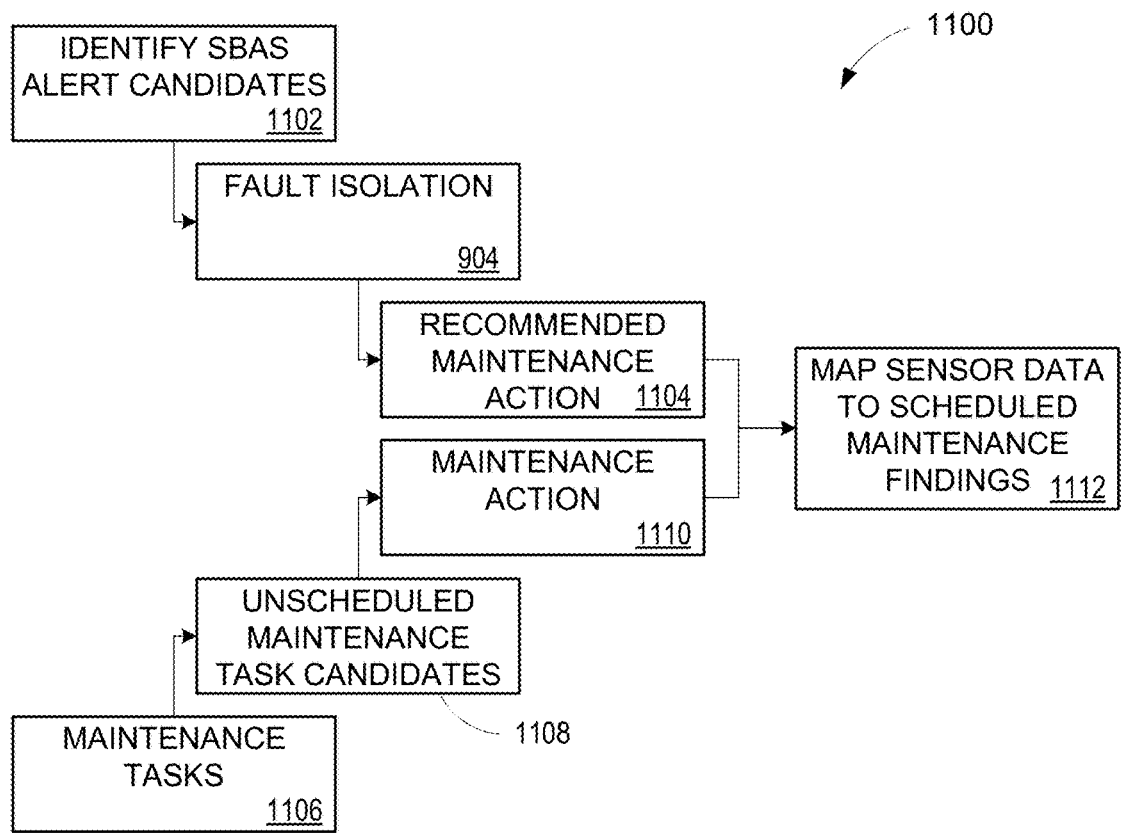
FIG. 11 is a block diagram of an implementation of a sensor mapping operation.

FIG. 11 is a block diagram 1100 of an implementation of a sensor mapping operation. Operation 1102 is a portion of the task and alert selection process 910, in which candidate SBAS alerts are identified. In some implementations, operation 1102 includes adjusting an alert threshold (e.g., the threshold 506 of FIG. 5) in order to find an optimum alert threshold. If a sensor alert provides too many false positives that are relied upon, the resulting unscheduled inspections will increase maintenance costs. In some example, the sensor itself is adjusted to change the alert conditions to a lower false positive rate. This is used with the fault isolation information 904 which, in some implementations, is sourced from fault isolation manuals provided by component vendors. These data sets are then analyzed with recommended maintenance actions 1104.

Also, maintenance tasks 1106, which in some implementations is derived from the historical maintenance data 420, are used to identify unscheduled maintenance task information. Unscheduled maintenance task candidates 1108 are selected, which provides failure information for various components and data on non-routine findings. Data regarding the unscheduled maintenance task candidates 1108 are also derived from the historical maintenance data 420, in some implementations. The maintenance actions 1110 are then compared with the recommended maintenance actions 1104 to map the sensor data 422 to maintenance findings at 1112. In some implementations, logical mapping of sensor data (including sensor alerts) to maintenance actions is followed by another stage of using historical data to ascertain whether the number of false alarm is too high.

Figure 12:
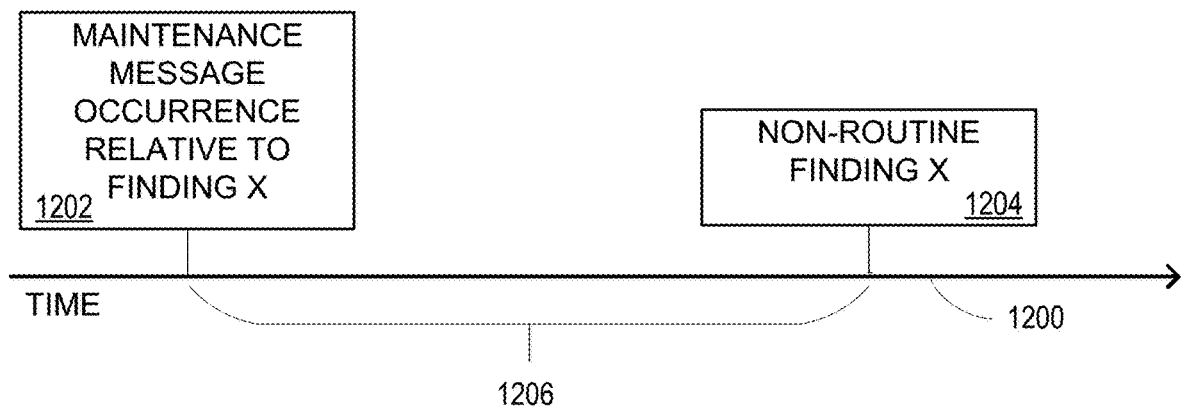
FIG. 12 is an illustration of a timeline for related events, relevant in generating an SDOMP 430.

FIG. 12 is an illustration of a timeline 1200 for related events, a first event 1202 and a second event 1204, relevant in generating the SDOMP 430. The first event 1202 is a maintenance message, for example a sensor alert or other reported sensor data, followed by the second event 1204 after an interval 1206. The second event 1204 is a non-routine finding, identified as non-routine finding X. Initially, it is possible that a correlation between the first event 1202 and the second event 1204 is not recognized. However, during a mapping operation, a correlation between the first event 1202 and the second event 1204 is identified. For example, if significant number of non-routine findings had been preceded by a relevant maintenance message, it is often possible to establish a correlation.

Figure 13:
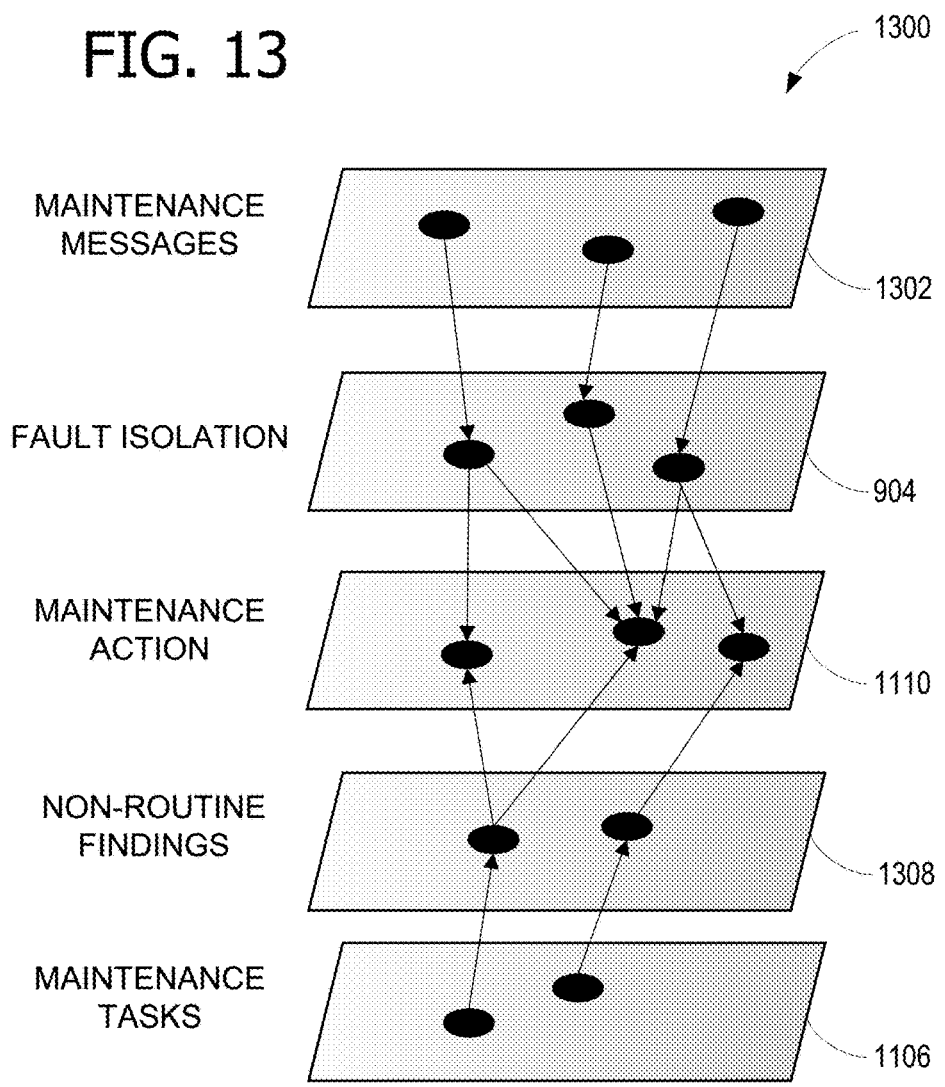
FIG. 13 illustrates relationships between non-routine findings and maintenance messages.

FIG. 13 illustrates relationships between maintenance tasks (via non-routine findings) and maintenance messages in a notional temporal relationship network 1300. FIG. 13 provides an additional perspective for understanding the block diagram 1100 of FIG. 11. In some example, the sensor data 422 (whether alerts or generic sensor data) does not map one-to-one with maintenance tasks (such as inspections) and/or non-routine findings. In embodiments, there is a one-to-many relationship, a many-to-one relationship, and combinations, with overlap. For example, multiple sensor alerts correlate with a first non-routine finding, and one or more of those multiple sensor alerts additionally correlate with a plurality of other non-routine findings.

In general, the sensor data 422 brings two considerations: probability of detection (with the accompanying probability of false alarm), and relevance. The first consideration, probability of detection, is a reliability consideration, addressing the question of how reliably the sensor data 422 predicts a non-routine finding. It is often possible to establish relevance with a statistical analysis that calculates a correlation. A correlation is a mathematical specification of relatedness between two events. One correlation method, used in some implementations, is a Pearson correlation coefficient (PCC), which is a measure of the linear correlation between two variables X and Y. A perfect correlation indicates that two events always occur together, whereas with uncorrelated events, when one event occurs, there is no probative value in predicting whether a second event will occur. The sensor data 422 is analyzed for reliability and relevance to maintenance tasks, non-routine findings, and maintenance actions.

The notional temporal relationship network 1300 answers questions such as: What is the relevance of a particular sensor or set of sensors? To what extent is the sensor data 422 trustworthy? What leverage is provided by the sensor data 422 for improving predictive value? For example, the significance of maintenance messages 1302 is identified using the fault isolation information 904. The maintenance tasks 1106 are used to identify non-routine findings 1308. A relationship is then found between the fault isolation information 904 and the maintenance actions 1110, and a relationship is the found between the non-routine findings 1308 and the maintenance actions 1110. This then completes a mapping between the maintenance messages 1302 and the maintenance tasks 1106, to facilitate quantification of the correlation between maintenance findings and relevant sensor alerts and other sensor data.

FIGS. 14A-D illustrate the net benefit for various scenarios of leveraging sensor data. Referring back to FIG. 8, a set of example cases is described, in which the physical inspection interval is T. T is found as the inverse function (plotted as the CDF curve 602) of the risk, R, and T' is the escalated interval. Thus, the number of scheduled maintenance actions i 1/T and 1/T' per unit time, respectively, for the original and escalated intervals. The benefit of escalation, B, is calculated by:

$$B = (1/T - 1/T') \times C\_\text{scheduled} \quad \text{Equation 8:}$$

Where C_scheduled is the cost of the scheduled maintenance for the task.

Figure 14:
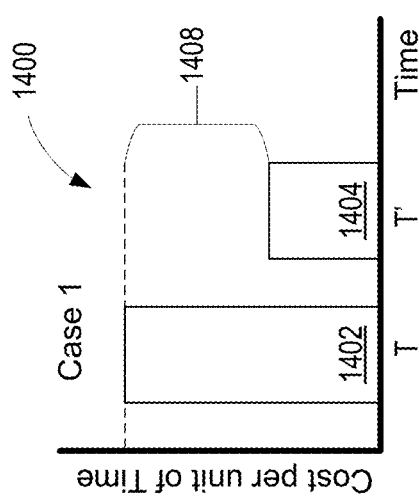
FIGS. 14A-D illustrate the net benefit for various scenarios of leveraging sensor data.

FIG. 14A shows a bar graph 1400 for a Case 1: An airline has a process to deal with a sensor based alert. Thus, there is already a business process in place to handle inspections that are triggered by an alert, and so the cost of inspection is not included. The net benefit of SBAS escalation, as shown in Equation 8, is B. In the bar graph 1400, a bar 1402 shows the original cost of scheduled maintenance with interval T. A bar 1404 shows the new cost per unit of time of scheduled maintenance with interval T', and the benefit, B, is shown as a difference 1408.

FIG. 14B shows a bar graph 1410 for a Case 2.1: An airline does not have a process to deal with a sensor based alert, and the sensor threshold cannot be changed to reduce false alarms. The net benefit of SBAS escalation, as shown in Equation 9, is B:

$$B = (1/T - 1/T') \times C\_\text{scheduled} - P_{FA} \times C\_\text{unscheduled} \quad \text{Equation 9:}$$

Where PFA is the probability of a false sensor alert, and C_scheduled is the cost of the unscheduled maintenance for the task. In the bar graph 1410, a bar 1416 shows the cost of unscheduled maintenance with interval T', so it is added atop the bar 1404. The net benefit, B, is shown as a difference 1418. If the sensor false alarms so much that the net benefit is negative (e.g., more money is spent), then the sensor data should not be used to escalate the maintenance interval.

FIG. 14C shows a bar graph 1420 for a Case 2.2, which is similar to Case 2.2, except it is possible to change the sensor alert threshold (e.g., the threshold 506 of FIG. 5) to reduce PFA. Initially, the PFA and C unscheduled create an unscheduled maintenance cost, shown as a bar 1426 atop bar 1404, that is so high, the net benefit is negative. Thus, the sensor alert threshold is adjusted to reduce PFA. This has the effect of decreasing probability of detection, P(S), so the new interval will be T" with the lower P(S).

FIG. 14D shows a bar graph 1430, also for Case 2.2, but reflecting the new interval T". In the bar graph 1430, a bar 1434 shows the new cost of scheduled maintenance with interval T", which is higher (reflecting higher cost) than the bar 1404 in FIGS. 14A-C. A bar 1436, atop the bar 1434, shows the unscheduled maintenance cost, due to C_unscheduled and the reduced $P_{FA}$. The net benefit, B, is shown as a difference 1438. The bar graph 1430 demonstrates the scenario where there exists an alert threshold where the combination of $P_{FA}$ and $P_D$ (probability of a correct detection and alert) yields a net benefit greater than zero. Together, FIG. 14A-D demonstrate that, although reliance on the sensor data 422 reduces maintenance events when the probability of false alarms is sufficiently low, when the probability of false alarms is too high, reliance on the sensor data 422 unnecessarily increases maintenance events, thereby potentially increasing operator costs.

Figure 15:
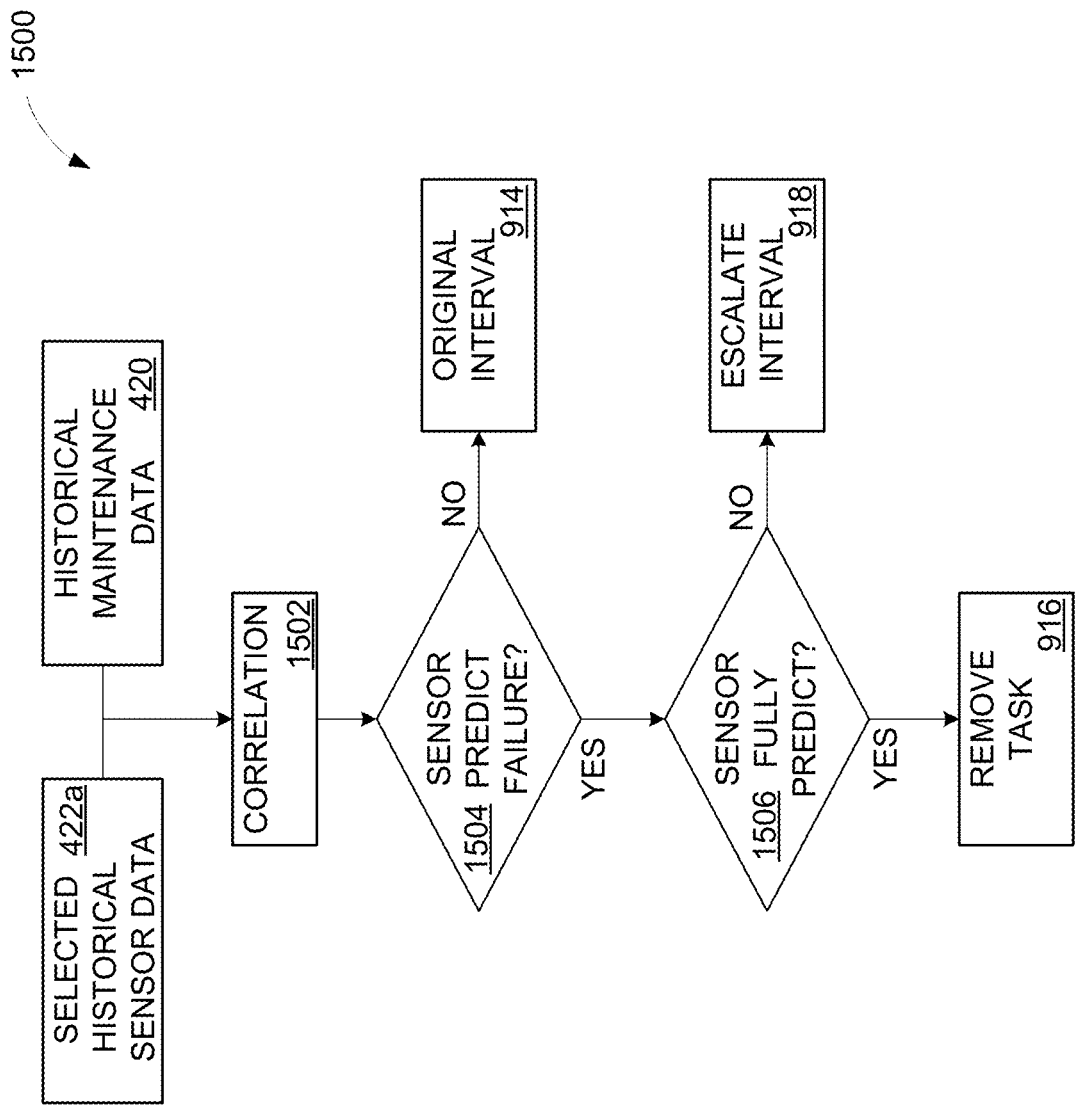
FIG. 15 is a flow chart illustrating an implementation of an operation of determining whether to escalate a maintenance task.

FIG. 15 is provides a flow chart 1500 illustrating an implementation of an operation of determining whether to escalate a maintenance task. The flow chart 1500 provides further explanation of the decision operation 912. Selected historical sensor data 422a, which is a subset of the sensor data 422, is combined with the historical maintenance data 420 in a correlation operation 1502 that, in some implementations, is represented by the notional temporal relationship network 1300. Decision operation 1504 determines whether the sensor data 422 could have predicted a failure or other non-routine finding. If not, then the result is the decision 914 to retain the original maintenance interval. It should be noted that the determination in the decision operation 1504 is unlikely to be a clear yes or no result. In one example, the decision is premised on a predictive value calculation that rarely reaches 0.0, but instead has low values for the no result. That is, in some implementations, the predictive value is compared with a threshold to provide the yes or no result.

If the sensor data 422 could have predicted the failure or non-routine finding, then decision operation 1506 determines whether the sensor data 422 could have fully predicted the non-routine finding (e.g., degradation or failure or other non-routine finding). If yes, then the result is the decision 916 to remove the maintenance task from physical inspection and use virtual inspection (via sensors). Similarly to the decision operation 1504, some implementations of the decision operation 1506 use a second threshold, rather than requiring an absolutely perfect sensor data predictive value. If the sensor data 422 is not fully predictive, then the sensor data 422 could have only partially predicted the failure or other non-routine finding (reducing, rather than eliminating risk), and the result is the decision 918 to escalate the maintenance interval. Part of this process (escalating the maintenance interval) is the modification of the detection probability illustrated in FIG. 8. Referencing the threshold used in the decision operation 1504, escalating an inspection interval occurs when the predictive value of the sensor data 422 meets the threshold.

Figure 16:
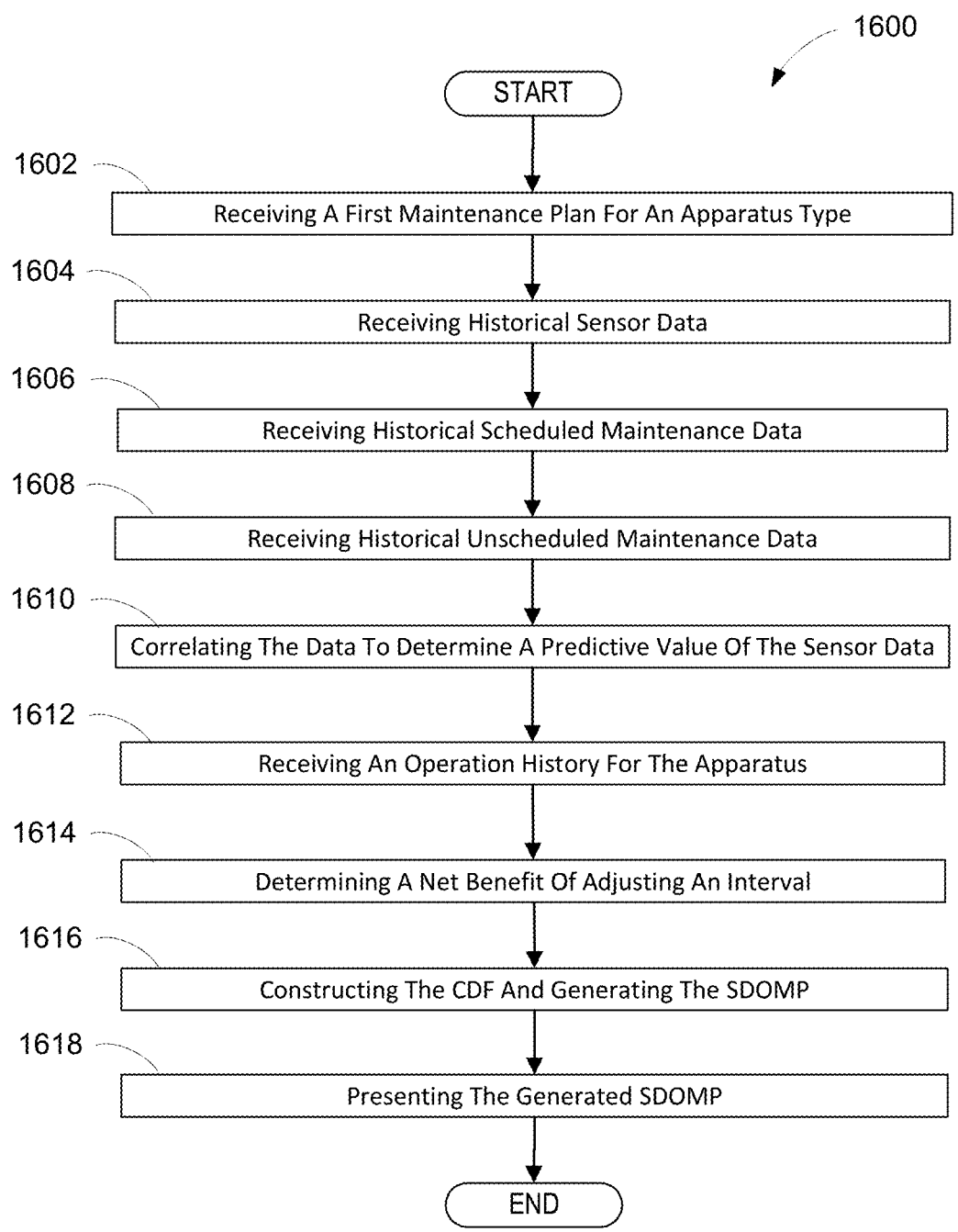
FIG. 16 is a flow chart illustrating an implementation of an operation of generating the SDOMP 430.

With reference now to FIG. 16, a flow chart 1600 illustrates an implementation of an operation for generating the SDOMP 430. In one embodiment, the operations illustrated in FIG. 16 are performed by the analysis component 428 providing instructions to the one or more processors 402. Operation 1602 includes receiving a first maintenance plan for an apparatus type, the first maintenance plan defining maintenance tasks for the apparatus type and defining intervals at which the maintenance tasks are to be performed. In some implementations, the first maintenance plan comprises an AMP (e.g., the AMP 414). In some implementations, the apparatus type is an airplane (e.g., the flying module 201).

Operation 1604 includes receiving historical sensor data (e.g., from the sensor data 422); operation 1606 includes receiving historical scheduled maintenance data (e.g., from the historical maintenance data 420), and operation 1608 includes receiving historical unscheduled maintenance data (e.g., from the historical maintenance data 420). In some implementations, the received sensor data comprises SBAS alert data. In some implementations, the SBAS alert data comprises at least one data type selected from the list consisting of: tire pressure, oxygen pressure, hydraulic fluid, APU oil level, and engine oil level.

Operation 1610 includes correlating the historical sensor data with the historical scheduled maintenance data and the historical unscheduled maintenance data to determine a predictive value of the sensor data 422. In some implementations, determining a predictive value of the sensor data 422 comprises determining a probability that a sensor alert corresponds to a non-routine finding. Operation 1612 includes receiving an operation history for the apparatus and operation 1614 includes determining a net benefit of adjusting an interval. False alarms (false positives) and missed detections (false negatives) drive up maintenance costs. See for example, the description of FIGS. 14C and 14D. In some implementations, this cost information is weighted according to the probability of false alarms and missed detections. For example, when a first maintenance task is deferred, due to reliance upon a sensor, and the result is that a second, more expensive maintenance task is then needed, then the cost of the second, more expensive maintenance task is used in the determined cost. Operations 1612 and 1614 use data from the other data and logic 434, and are further described in relation to FIGS. 17-19.

Operation 1616 includes constructing the CDF curve 602 and, based at least on the predictive value of the sensor data 422, generating the SDOMP (e.g., the SDOMP 430), the generated SDOMP 430 comprising an adjusted one of the defined intervals. In some implementations, generating the SDOMP 430 is based at least on the predictive value of the sensor data 422 and the maintenance optimization objectives 418 comprises escalating an inspection interval when the predictive value of the sensor data 422 meets a threshold. In some implementations, generating the SDOMP 430 further comprises generating the SDOMP 430 based at least on the operation history for the apparatus. In some implementations, generating the SDOMP 430 further comprises generating the SDOMP 430 based at least on the end date. In some implementations, generating the SDOMP further comprises generating the SDOMP 430 based at least on the cost associated with the maintenance tasks. Operation 1618 then includes presenting the generated SDOMP 430, for example on the presentation component 404.

Figure 17:
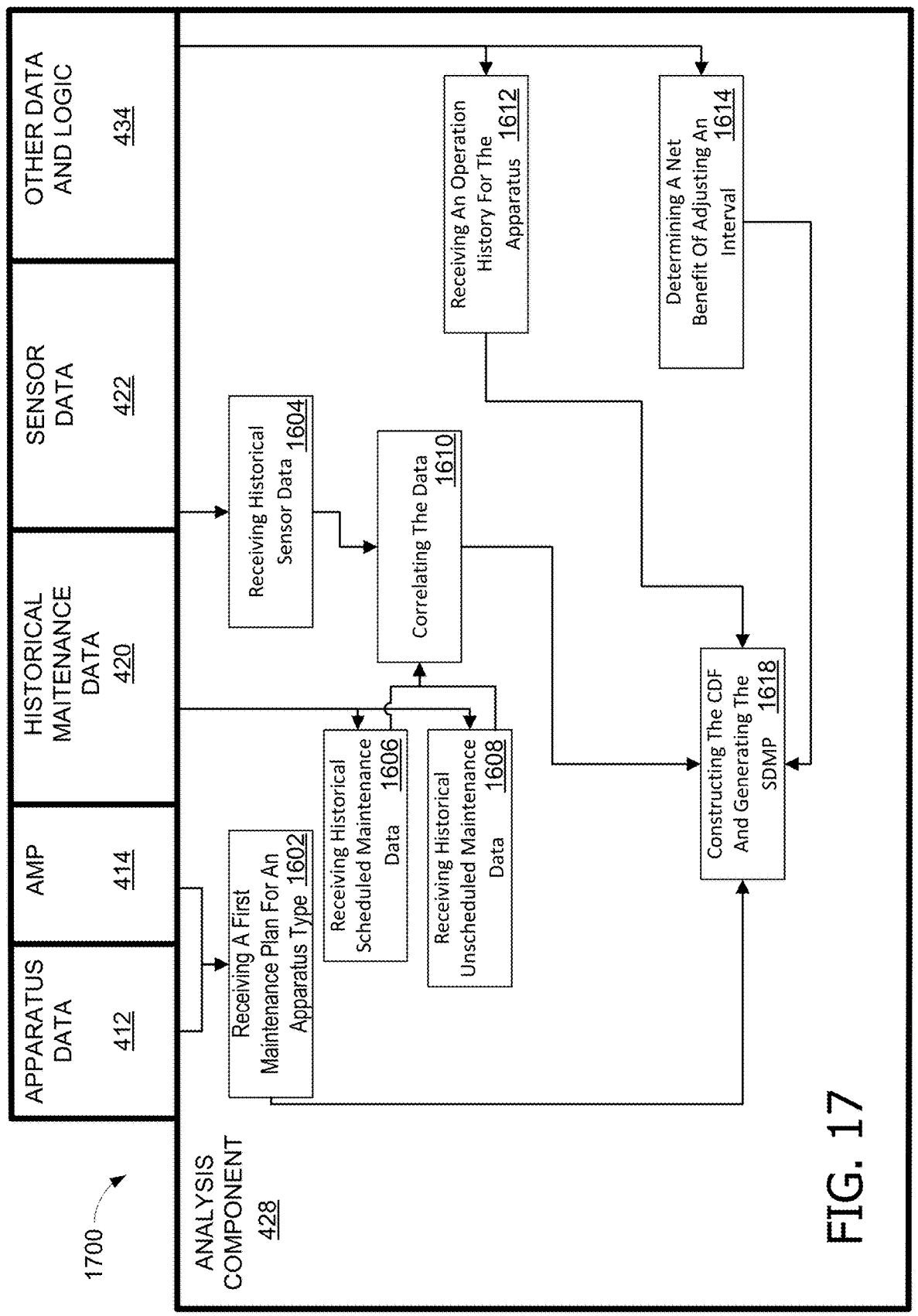
FIG. 17 is a block diagram illustrating a process for generating the SDOMP 430.

FIG. 17 is a block diagram illustrating a process 1700 for the analysis component 428 to generate the SDOMP 430. The apparatus data 412 and the AMP 141 are used by the analysis component 428 in the operation 1602; and the historical maintenance data 420 is used in the operations 1606 and 1608. The sensor data 422 (such as the historical sensor data) is used by the analysis component 428 in the operation 1604; and the results of the operations 1604, 1606, and 1608 are used in the operation 1610. The analysis component 428 uses the other data and logic 434 in the operations 1612 and 1614. In some implementations, the other data and logic 434 comprises the operation history for the apparatus, the end date to the SDOMP 430 (e.g., the lease end date), and data for determining a net benefit of adjusting an interval (e.g., using the maintenance costs 416). The results of operations 1602, 1610, 1612 and 1614 are used in operation 1616 to generate the SDOMP 430.

Figure 18:
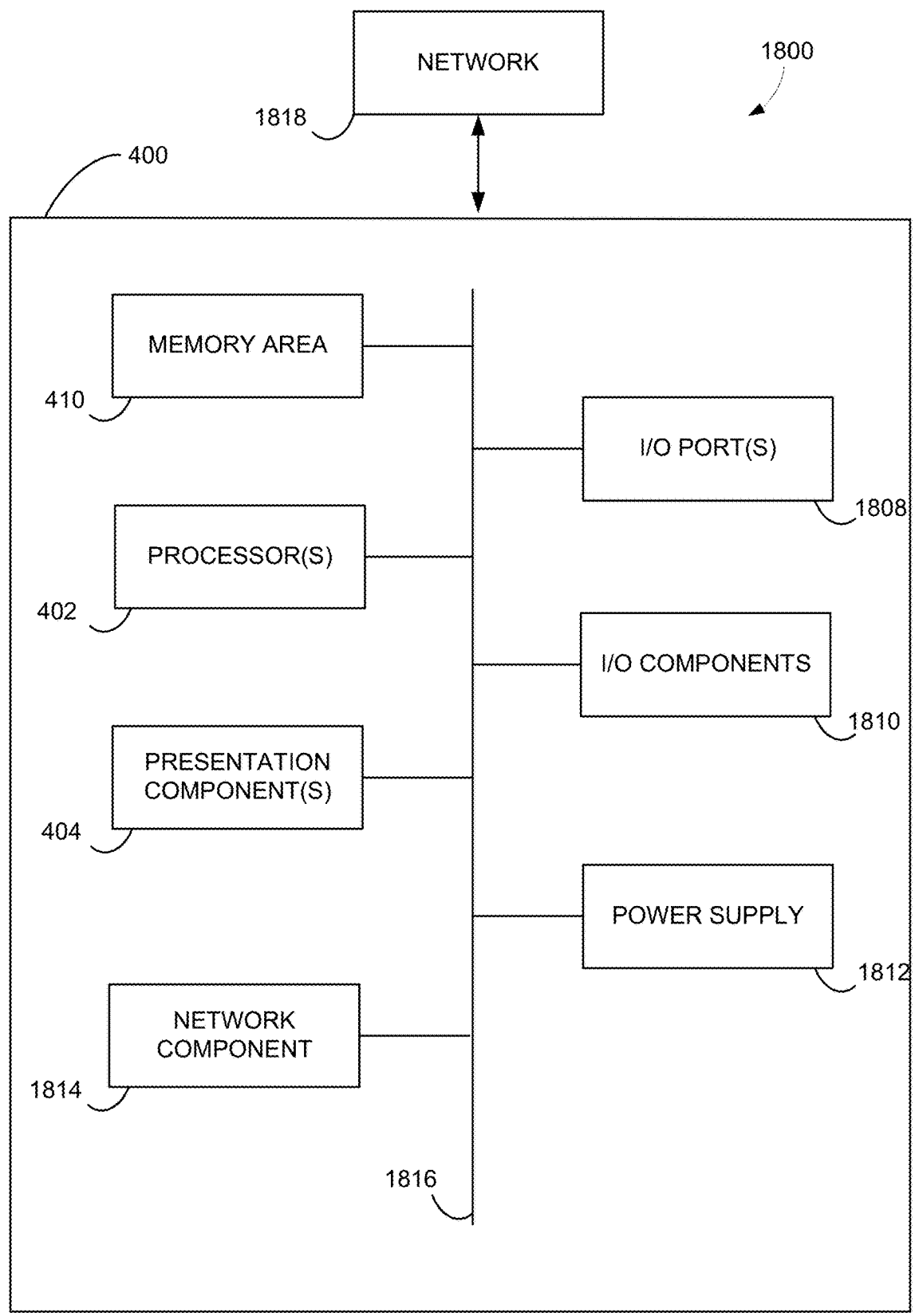
FIG. 18 is a block diagram illustrating an implementation of a system suitable for implementing various aspects of the disclosure.

FIG. 18 is a block diagram of a system 1800 for generating an SDOMP. The system 1800 is one implementation of a suitable computing environment and is not intended to suggest any limitation as to the scope of use or functionality of the invention. Neither should the system 1800 be interpreted as having any dependency or requirement relating to any one or combination of components/modules illustrated.

The implementations and embodiments disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

The system 1800 includes a computing device (e.g., the computing device 400) communicatively coupled to a network 1818. The computing device 400 includes a bus 1816 that directly or indirectly couples the following devices: the memory area 410, the one or more processors 402, the one or more presentation components 404, input/output (I/O) ports 1808, I/O components 1810, a power supply 1812, and a network component 1814. The system 1800 should not be interpreted as having any dependency or requirement related to any single component or combination of components illustrated therein. While the system 1800 is depicted as a seemingly single device, in one embodiment, multiple computing devices work together and share the depicted device resources. For instance, in one embodiment, the memory area 410 is distributed across multiple devices, the processor(s) 402 provided are housed on different devices, and so on.

The bus 1816 represents one or more busses (such as an address bus, data bus, or a combination thereof). Although the various blocks of FIG. 18 are shown with lines for the sake of clarity, in reality, delineating various components is not so clear, and metaphorically, the lines would more accurately be grey and fuzzy. For example, one considers a presentation component such as a display device to be an I/O component. Also, processors have memory. Such is the nature of the art, and the diagram of FIG. 18 is merely illustrative of a system or computing device used in connection with one or more embodiments of the present disclosure. Distinction is not made between such categories as "workstation," "server," "laptop," "hand-held device," etc., as all are contemplated within the scope of FIG. 18 and the references herein to a "computing device."

In one embodiment, the memory area 410 includes any of the computer-readable media discussed herein. In one embodiment, the memory area 410 is used to store and access instructions configured to carry out the various operations disclosed herein. In some implementations, the memory area 410 includes computer storage media in the form of volatile and/or nonvolatile memory, removable or non-removable memory, data disks in virtual environments, or a combination thereof.

In one embodiment, the processor(s) 402 includes any quantity of processing units that read data from various entities, such as the memory area 410 or the I/O components 1810. Specifically, the processor(s) 402 are programmed to execute computer-executable instructions for implementing aspects of the disclosure. In one embodiment, the instructions are performed by the processor, by multiple processors within the computing device 400, or by a processor external to the computing device 400. In some implementations, the processor(s) 402 are programmed to execute instructions such as those illustrated in the flowcharts discussed below and depicted in the accompanying drawings. Moreover, in some implementations, the processor(s) 402 represent an implementation of analog techniques to perform the operations described herein. For example, the operations are performed by an analog client computing device and/or a digital client computing device.

The presentation component(s) 404 present data indications to an operator (e.g., owner of the apparatus or fleet of the apparatus, administrator responsible for the apparatus or fleet of the apparatus, or a user operating the apparatus) or to another device. In one implementation, presentation components include a display device, speaker, printing component, vibrating component, etc. One skilled in the art will understand and appreciate that computer data is presented in a number of ways, such as visually in a graphical user interface (GUI), audibly through speakers, wirelessly between the computing device 400, across a wired connection, or in other ways.

The ports 1808 allow the computing device 400 to be logically coupled to other devices including the I/O components 1810, some of which is built in. Implementations of the I/O components 1810 include, for example but without limitation, a microphone, keyboard, mouse, joystick, game pad, satellite dish, scanner, printer, wireless device, etc.

In some implementations, the network component 1814 includes a network interface card and/or computer-executable instructions (e.g., a driver) for operating the network interface card. In one embodiment, communication between the computing device 400 and other devices occur using any protocol or mechanism over any wired or wireless connection. In some implementations, the network component 1814 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 400, implementations of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

In one embodiment, implementations of the disclosure are described in the general context of computer-executable instructions, such as program modules, executed by one or more computers or other devices in software, firmware, hardware, or a combination thereof. In one embodiment, the computer-executable instructions are organized into one or more computer-executable components or modules. Generally, program modules include, but are not limited to, routines, programs, objects, components, and data structures that perform particular tasks or implement particular abstract data types. In one embodiment, aspects of the disclosure are implemented with any number and organization of such components or modules. For example, aspects of the disclosure are not limited to the specific computer-executable instructions or the specific components or modules illustrated in the figures and described herein. Other implementations of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

The following paragraphs describe further aspects of the disclosure:

A1. A method for generating an SDOMP, the method comprising:

receiving a first maintenance plan for an apparatus type, the first maintenance plan defining maintenance tasks for the apparatus type and defining intervals at which the maintenance tasks are to be performed;

receiving historical sensor data, historical scheduled maintenance data, and historical unscheduled maintenance data;

correlating the historical sensor data with the historical scheduled maintenance data and the historical unscheduled maintenance data to determine a predictive value of the sensor data;

receiving one or more maintenance optimization objectives of an operator of an apparatus of the apparatus type; and based at least on the predictive value of the sensor data and the maintenance optimization objectives, generating the SDOMP, the generated SDOMP comprising an adjusted one of the defined intervals.

A2. The method of A1, wherein the first maintenance plan comprises an approved maintenance plan.

A3. The method of A1, wherein the apparatus type is an airplane.

A4. The method of A1, wherein the sensor data comprises airplane health management (AHM) alert data, and wherein the AHM alert data comprises at least one data type selected from the list consisting of:

tire pressure, oxygen pressure, hydraulic fluid, auxiliary power unit (APU) oil level, and engine oil level.

A5. The method of A1, wherein determining a predictive value of the sensor data comprises determining a probability that a sensor alert corresponds to a non-routine finding.

A6. The method of A1, wherein the one or more maintenance optimization objectives of the operator comprises an acceptable risk level.

A7. The method of A1, wherein generating the SDOMP based at least on the predictive value of the sensor data and the maintenance optimization objectives comprises escalating an inspection interval when the predictive value of the sensor data meets a threshold.

A8. The method of A1, further comprising:

receiving an operation history for the apparatus, and wherein generating the SDOMP further comprises generating the SDOMP based at least on the operation history for the apparatus.

A9. The method of A1, further comprising:

determining an end date to the SDOMP, and wherein generating the SDOMP further comprises generating the SDOMP based at least on the end date.

A10. The method of A1, further comprising:

determining a net benefit of adjusting an interval, and wherein generating the SDOMP further comprises generating the SDOMP based at least on the cost associated with the maintenance tasks.

A11. A system for generating an SDOMP, the system comprising:

one or more processors; and a memory area storing an analysis component, that when executed by the one or more processors, cause the one or more processors to perform operations comprising:
  receiving a first maintenance plan for an apparatus type, the first maintenance plan defining maintenance tasks for the apparatus type and defining intervals at which the maintenance tasks are to be performed;
  receiving historical sensor data, historical scheduled maintenance data, and historical unscheduled maintenance data;
  correlating the historical sensor data with the historical scheduled maintenance data and the historical unscheduled maintenance data to determine a predictive value of the sensor data;
  receiving one or more maintenance optimization objectives of an operator of an apparatus of the apparatus type; and
  based at least on the predictive value of the sensor data and the maintenance optimization objectives, generating the SDOMP, the generated SDOMP comprising an adjusted one of the defined intervals.

A12. The system of A11, wherein the first maintenance plan comprises an approved maintenance plan.

A13. The system of A11, wherein the apparatus type is an airplane.

A14. The system of A11, wherein the sensor data comprises AHM alert data, and wherein the AHM alert data comprises at least one data type selected from the list consisting of:
tire pressure, oxygen pressure, hydraulic fluid, auxiliary power unit (APU) oil level, and engine oil level.

A15. The system of A11, wherein determining a predictive value of the sensor data comprises determining a probability that a sensor alert corresponds to a non-routine finding.

A16. The system of A11, wherein the one or more maintenance optimization objectives of the operator comprises an acceptable risk level.

A17. The system of A11, wherein generating the SDOMP based at least on the predictive value of the sensor data and the maintenance optimization objectives comprises escalating an inspection interval when the predictive value of the sensor data meets a threshold.

A18. The system of A11, wherein the operations further comprise:
receiving an operation history for the apparatus, and
wherein generating the SDOMP further comprises generating the SDOMP based at least on the operation history for the apparatus.

A19. The system of A11, wherein the operations further comprise:
determining an end date to the SDOMP, and
wherein generating the SDOMP further comprises generating the SDOMP based at least on the end date.

A20. The system of A11, wherein the operations further comprise:
determining a net benefit of adjusting an interval, and
wherein generating the SDOMP further comprises generating the SDOMP based at least on the cost associated with the maintenance tasks.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for generating a sensor driven maintenance program, the method comprising:
  receiving a first maintenance plan for an apparatus type, the first maintenance plan defining maintenance tasks for the apparatus type and defining a plurality of intervals at which the maintenance tasks are to be performed, a first interval in the plurality of intervals comprising a first maintenance task and a second maintenance task;
  receiving historical sensor data, historical scheduled maintenance data, and historical unscheduled maintenance data;
  correlating the historical sensor data with the historical scheduled maintenance data and the historical unscheduled maintenance data to determine how accurate the historical sensor data was at detecting expected conditions and unexpected conditions;
  determining that an accuracy of the historical sensor data is above a sensor alert threshold;
  based on the determining, assigning a predictive value to sensor data;
  receiving one or more maintenance enhanced objectives of an operator of an apparatus of the apparatus type;
  based on the predictive value meeting a predictive threshold, removing the first maintenance task from the first maintenance plan to generate the sensor driven maintenance program and replacing a physical inspection associated with the first maintenance task with a virtual inspection executed with a sensor to monitor for a condition associated with the first maintenance task;
  based at least on the predictive value not meeting the predictive threshold and the maintenance enhanced objectives, generating the sensor driven maintenance program, the generated sensor driven maintenance program comprising an adjusted first interval, the adjusted first interval being delayed in time compared to the first interval, the adjusted first interval comprising the first maintenance task and not the second maintenance task; and
  based on executing the generated sensor driven maintenance program, causing the first maintenance task in the adjusted first interval to be executed at the delayed time.

2. The method of claim 1, wherein the first maintenance plan comprises an approved maintenance plan.

3. The method of claim 1, wherein the apparatus type is an airplane.

4. The method of claim 1, wherein the historical sensor data comprises apparatus health management (AHM) alert data, and wherein the AHM alert data comprises at least one data type selected from the list consisting of:
tire pressure, oxygen pressure, hydraulic fluid, auxiliary power unit (APU) oil level, and engine oil level.

5. The method of claim 1, wherein the adjusted one of the plurality of defined intervals is escalated based on the generated sensor driven maintenance program.

6. The method of claim 1, wherein the one or more maintenance enhanced objectives of the operator comprises an acceptable risk level.

7. The method of claim 1, wherein generating the sensor driven maintenance program based at least on the predictive value of the sensor data and the maintenance enhanced objectives comprises escalating an inspection interval when the predictive value of the sensor data meets the predictive threshold.

8. The method of claim 1, further comprising:
receiving an operation history for the apparatus, and
wherein generating the sensor driven maintenance program further comprises generating the sensor driven maintenance program based at least on the operation history for the apparatus.

9. The method of claim 1, further comprising:
determining an end date to the sensor driven maintenance program, and wherein generating the sensor driven maintenance program further comprises
generating the sensor driven maintenance program based at least on the end date.

10. The method of claim 1, further comprising:
determining a net benefit of adjusting an interval, and
wherein generating the sensor driven maintenance program further comprises generating the sensor driven maintenance program based at least on the cost associated with the maintenance tasks.

11. A system for generating a sensor driven maintenance program, the system comprising:
one or more processors; and
a memory area storing an analysis component, that when executed by the one or more processors, cause the one or more processors to perform operations comprising:
receiving a first maintenance plan for an apparatus type, the first maintenance plan defining maintenance tasks for the apparatus type and defining a plurality of intervals at which the maintenance tasks are to be performed, a first interval in the plurality of intervals comprising a first maintenance task and a second maintenance task;
receiving historical sensor data, historical scheduled maintenance data, and historical unscheduled maintenance data;
correlating the historical sensor data with the historical scheduled maintenance data and the historical unscheduled maintenance data to determine how accurate the historical sensor data was at detecting expected conditions and unexpected conditions;
determining that an accuracy of the historical sensor data is above a sensor alert threshold;
based on the determining, assigning a predictive value to sensor data;
receiving one or more maintenance enhanced objectives of an operator of an apparatus of the apparatus type;
based on the predictive value meeting a predictive threshold, removing the first maintenance task from the first maintenance plan to generate the sensor driven maintenance program and replacing a physical inspection associated with the first maintenance task with a virtual inspection executed with a sensor to monitor for a condition associated with the first maintenance task;
based at least on the predictive value not meeting the predictive threshold and the maintenance enhanced objectives, generating the sensor driven maintenance program, the generated sensor driven maintenance program comprising an adjusted first interval, the adjusted first interval being delayed compared to the first interval, the adjusted first interval comprising the first maintenance task and not the second maintenance task; and
based on executing the generated sensor driven maintenance program, causing the first maintenance task in the adjusted first interval to be executed.

12. The system of claim 11, wherein the first maintenance plan comprises an approved maintenance plan.

13. The system of claim 11, wherein the apparatus type is an airplane.

14. The system of claim 11, wherein the historical sensor data comprises apparatus health management (AHM) alert data, and wherein the AHM alert data comprises at least one data type selected from the list consisting of:
tire pressure, oxygen pressure, hydraulic fluid, auxiliary power unit (APU) oil level, and engine oil level.

15. The system of claim 11, wherein the adjusted one of the plurality of defined intervals is escalated based on the generated sensor driven maintenance program.

16. The system of claim 11, wherein the one or more maintenance enhanced objectives of the operator comprises an acceptable risk level.

17. The system of claim 11, wherein generating the sensor driven maintenance program based at least on the predictive value of the historical sensor data and the maintenance enhanced objectives comprises escalating an inspection interval when the predictive value of the sensor data meets the predictive threshold.

18. The system of claim 11, wherein the operations further comprise:
receiving an operation history for the apparatus, and
wherein generating the sensor driven maintenance program further comprises generating the sensor driven maintenance program based at least on the operation history for the apparatus.

19. The system of claim 11, wherein the operations further comprise:
determining an end date to the sensor driven maintenance program, and wherein generating
the sensor driven maintenance program further comprises generating the sensor driven maintenance program based at least on the end date.

20. The system of claim 11, wherein the operations further comprise:
determining a net benefit of adjusting an interval, and
wherein generating the sensor driven maintenance program further comprises generating the sensor driven maintenance program based at least on the cost associated with the maintenance tasks.

* * * * *

UNITED STATES PATENT AND TRADEMARK OFFICE
CERTIFICATE OF CORRECTION

PATENT NO. : 11,783,301 B2
APPLICATION NO. : 16/238424
DATED : October 10, 2023
INVENTOR(S) : Mohammad Mojtahedzadeh et al.

It is certified that error appears in the above-identified patent and that said Letters Patent is hereby corrected as shown below:

In the Specification

At Column 8, Line 2, "reducing PD" should be --reducing $P_D$--;
At Column 13, Line 2, "Where PFA is" should be --Where $P_{FA}$ is--;
At Column 13, Lines 13-17, "to reduce PFA. Initially, the PFA and C unscheduled create an unscheduled maintenance cost, shown as a bar 1426 atop bar 1404, that is so high, the net benefit is negative. Thus, the sensor alert threshold is adjusted to reduce PFA." should be --to reduce $P_{FA}$. Initially, the $P_{FA}$ and C_unscheduled create an unscheduled maintenance cost, shown as a bar 1426 atop bar 1404, that is so high, the net benefit is negative. Thus, the sensor alert threshold is adjusted to reduce $P_{FA}$.--.

Signed and Sealed this
Ninth Day of April, 2024

*Katherine Kelly Vidal*

Katherine Kelly Vidal
*Director of the United States Patent and Trademark Office*